US008682162B2

(12) United States Patent
Farmer et al.

(10) Patent No.: US 8,682,162 B2
(45) Date of Patent: *Mar. 25, 2014

(54) METHOD AND SYSTEM FOR PROVIDING A RETURN PATH FOR SIGNALS GENERATED BY LEGACY TERMINALS IN AN OPTICAL NETWORK

(75) Inventors: James O. Farmer, Cumming, GA (US); Deven J. Anthony, Tampa, FL (US); Stephen A. Thomas, Marietta, GA (US); Patrick W. Quinn, Lafayette, CA (US)

(73) Assignee: Aurora Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/163,703

(22) Filed: Jun. 19, 2011

(65) Prior Publication Data

US 2012/0057877 A1 Mar. 8, 2012

Related U.S. Application Data

(63) Continuation of application No. 12/287,720, filed on Oct. 10, 2008, now Pat. No. 7,986,880.

(51) Int. Cl.
*H04B 10/00* (2013.01)

(52) U.S. Cl.
USPC ............................................. 398/72; 398/66

(58) Field of Classification Search
USPC ...................................................... 398/66–72
See application file for complete search history.

(56) References Cited

U.S. PATENT DOCUMENTS

| 4,183,054 | A | * | 1/1980 | Patisaul et al. ................. 725/146 |
| 4,253,035 | A | | 2/1981 | Amitay |
| 4,295,005 | A | | 10/1981 | Daugherty et al. |
| 4,495,545 | A | | 1/1985 | Dufresne et al. |
| 4,654,891 | A | | 3/1987 | Smith |
| 4,655,517 | A | | 4/1987 | Bryce |
| 4,665,517 | A | | 5/1987 | Widmer |
| 4,733,398 | A | | 3/1988 | Shibagaki et al. |
| 4,763,317 | A | * | 8/1988 | Lehman et al. ............... 370/358 |
| 4,805,979 | A | | 2/1989 | Bossard et al. |

(Continued)

FOREIGN PATENT DOCUMENTS

| CA | 2107922 A1 | 4/1995 |
| EP | 0720322 A2 | 3/1995 |

(Continued)

OTHER PUBLICATIONS

McDevitt et al., Switched vs Broadcast Video for Fiber-to-the Home Systems, Alcatel Network Systems, 1990, IEEE, CH2829-0/90/0000-1109, pp. 1109-1119.

(Continued)

*Primary Examiner* — Agustin Bello
(74) *Attorney, Agent, or Firm* — Smith Risley; Steven P. Wigmore

(57) ABSTRACT

A return path system includes inserting RF packets between regular upstream data packets, where the data packets are generated by communication devices such as a computer or interne telephone. The RF packets can be derived from analog RF signals that are produced by legacy video service terminals. In this way, the present invention can provide an RF return path for legacy terminals that shares a return path for regular data packets in an optical network architecture.

20 Claims, 16 Drawing Sheets

(56) References Cited

U.S. PATENT DOCUMENTS

| | | | |
|---|---|---|---|
| 4,852,023 A | 7/1989 | Lee et al. | |
| 4,891,694 A * | 1/1990 | Way | 725/114 |
| 4,945,541 A | 7/1990 | Nakayama | |
| 4,956,863 A | 9/1990 | Goss | |
| 4,975,899 A * | 12/1990 | Faulkner | 398/66 |
| 5,029,333 A * | 7/1991 | Graves et al. | 370/490 |
| 5,099,471 A * | 3/1992 | Tsukada et al. | 398/98 |
| 5,105,336 A | 4/1992 | Jacoby et al. | |
| 5,121,240 A | 6/1992 | Acampora | 398/101 |
| 5,132,992 A | 7/1992 | Yurt et al. | |
| 5,144,267 A * | 9/1992 | West, Jr. | 333/28 R |
| 5,179,591 A | 1/1993 | Hardy et al. | |
| 5,189,725 A | 2/1993 | Bensel, III et al. | |
| 5,247,347 A | 9/1993 | Litteral et al. | |
| 5,249,194 A | 9/1993 | Sakanushi | |
| 5,253,250 A | 10/1993 | Schlafer et al. | |
| 5,253,275 A | 10/1993 | Yurt et al. | |
| 5,301,050 A * | 4/1994 | Czerwiec et al. | 398/30 |
| 5,303,295 A * | 4/1994 | West et al. | 380/208 |
| 5,313,546 A | 5/1994 | Toffetti | |
| 5,325,223 A | 6/1994 | Bears | |
| 5,345,504 A | 9/1994 | West, Jr. | |
| 5,349,457 A | 9/1994 | Bears | |
| 5,365,585 A | 11/1994 | Puhl et al. | |
| 5,365,588 A | 11/1994 | Bianco et al. | |
| 5,378,174 A | 1/1995 | Brownlie et al. | |
| 5,402,315 A | 3/1995 | Reichle | |
| 5,412,498 A | 5/1995 | Arstein et al. | |
| 5,432,875 A | 7/1995 | Korkowski et al. | |
| 5,469,507 A | 11/1995 | Canetti et al. | |
| 5,495,549 A | 2/1996 | Schneider et al. | |
| 5,510,921 A * | 4/1996 | Takai et al. | 398/79 |
| 5,517,346 A * | 5/1996 | Eckstein et al. | 398/161 |
| 5,528,455 A | 6/1996 | Miles | |
| 5,528,582 A | 6/1996 | Bodeep et al. | |
| 5,534,912 A | 7/1996 | Kostreski | |
| 5,541,917 A * | 7/1996 | Farris | 370/352 |
| 5,550,863 A | 8/1996 | Yurt et al. | |
| 5,557,317 A * | 9/1996 | Nishio et al. | 725/92 |
| 5,559,858 A | 9/1996 | Beveridge | |
| 5,566,099 A | 10/1996 | Shimada | |
| 5,572,347 A * | 11/1996 | Burton et al. | 398/71 |
| 5,572,348 A | 11/1996 | Carlson et al. | |
| 5,572,349 A | 11/1996 | Hale et al. | |
| 5,574,586 A * | 11/1996 | Chu et al. | 398/53 |
| 5,666,487 A | 9/1997 | Goodman et al. | |
| 5,687,014 A * | 11/1997 | Czerwiec et al. | 398/75 |
| 5,694,232 A | 12/1997 | Parsay et al. | |
| 5,701,186 A | 12/1997 | Huber | |
| 5,703,706 A * | 12/1997 | Eckstein et al. | 398/80 |
| 5,706,303 A | 1/1998 | Lawrence | |
| 5,715,020 A | 2/1998 | Kuroiwa et al. | |
| 5,731,546 A | 3/1998 | Miles et al. | |
| RE35,774 E | 4/1998 | Moura et al. | |
| 5,767,895 A * | 6/1998 | Yashiro et al. | 725/106 |
| 5,769,159 A | 6/1998 | Yun | |
| 5,778,017 A | 7/1998 | Sato et al. | |
| 5,781,320 A * | 7/1998 | Byers | 398/56 |
| 5,786,918 A * | 7/1998 | Suzuki et al. | 398/98 |
| 5,790,523 A | 8/1998 | Ritchie, Jr. et al. | |
| 5,793,413 A | 8/1998 | Hylton et al. | |
| 5,793,506 A * | 8/1998 | Schmid | 398/72 |
| 5,799,088 A | 8/1998 | Raike | |
| 5,802,089 A | 9/1998 | Link | |
| 5,815,295 A * | 9/1998 | Darcie et al. | 398/72 |
| 5,841,560 A * | 11/1998 | Prucnal | 398/101 |
| 5,861,966 A | 1/1999 | Ortel | |
| 5,867,485 A | 2/1999 | Chambers et al. | |
| 5,875,430 A | 2/1999 | Koether | |
| 5,880,864 A * | 3/1999 | Williams et al. | 398/71 |
| 5,892,865 A | 4/1999 | Williams | |
| 5,926,297 A * | 7/1999 | Ishikawa et al. | 398/43 |
| 5,926,303 A * | 7/1999 | Giebel et al. | 398/117 |
| 5,953,690 A | 9/1999 | Lemon et al. | |
| 5,969,836 A | 10/1999 | Foltzer | |
| 5,974,063 A | 10/1999 | Yoshida | |
| 6,002,692 A | 12/1999 | Wills | |
| 6,002,720 A | 12/1999 | Yurt et al. | |
| 6,041,056 A * | 3/2000 | Bigham et al. | 370/395.64 |
| 6,097,159 A | 8/2000 | Mogi et al. | |
| 6,097,515 A * | 8/2000 | Pomp et al. | 398/45 |
| 6,144,702 A | 11/2000 | Yurt et al. | |
| 6,151,343 A | 11/2000 | Jurgensen | |
| 6,167,553 A | 12/2000 | Dent | |
| 6,198,558 B1 * | 3/2001 | Graves et al. | 398/135 |
| RE37,125 E | 4/2001 | Carlson et al. | |
| 6,215,939 B1 | 4/2001 | Cloud | |
| 6,229,701 B1 | 5/2001 | Kung et al. | |
| 6,229,788 B1 * | 5/2001 | Graves et al. | 370/230 |
| 6,295,148 B1 | 9/2001 | Atlas | |
| 6,300,562 B1 | 10/2001 | Daoud | |
| 6,330,155 B1 | 12/2001 | Remsburg | |
| 6,336,201 B1 | 1/2002 | Geile et al. | |
| 6,342,004 B1 | 1/2002 | Lattimore et al. | |
| 6,356,369 B1 | 3/2002 | Farhan | |
| 6,360,320 B1 | 3/2002 | Ishiguro et al. | |
| 6,362,908 B1 * | 3/2002 | Kimbrough et al. | 398/164 |
| 6,385,366 B1 | 5/2002 | Lin | |
| 6,421,150 B2 | 7/2002 | Graves et al. | |
| 6,424,656 B1 | 7/2002 | Hoebeke | |
| 6,427,035 B1 | 7/2002 | Mahony | |
| 6,449,071 B1 * | 9/2002 | Farhan et al. | 398/79 |
| 6,449,408 B1 * | 9/2002 | Evans et al. | 385/27 |
| 6,452,714 B1 | 9/2002 | Rollins | |
| 6,457,178 B1 * | 9/2002 | Slim | 725/127 |
| 6,460,182 B1 | 10/2002 | BuAbbud | |
| 6,463,068 B1 | 10/2002 | Lin et al. | |
| 6,483,635 B1 | 11/2002 | Wach | |
| 6,486,907 B1 | 11/2002 | Farber et al. | |
| 6,490,727 B1 | 12/2002 | Nazarathy et al. | |
| 6,493,335 B1 * | 12/2002 | Darcie et al. | 370/344 |
| 6,496,641 B1 | 12/2002 | Mahony | |
| 6,507,494 B1 | 1/2003 | Hutchison et al. | |
| 6,523,177 B1 * | 2/2003 | Brown | 725/121 |
| 6,529,301 B1 | 3/2003 | Wang | |
| 6,535,715 B2 * | 3/2003 | Dapper et al. | 455/3.05 |
| 6,546,014 B1 | 4/2003 | Kramer et al. | |
| 6,577,414 B1 * | 6/2003 | Feldman et al. | 398/43 |
| 6,611,522 B1 | 8/2003 | Zheng et al. | |
| 6,621,975 B2 | 9/2003 | Laporte et al. | |
| 6,654,565 B2 | 11/2003 | Kenny | |
| 6,674,967 B2 | 1/2004 | Skrobko et al. | |
| 6,680,948 B1 | 1/2004 | Majd et al. | |
| 6,682,010 B2 | 1/2004 | Pohl | |
| 6,687,376 B1 | 2/2004 | Yamaguchi | |
| 6,687,432 B2 | 2/2004 | Schemmann et al. | |
| 6,707,024 B2 | 3/2004 | Miyamoto et al. | |
| 6,738,983 B1 | 5/2004 | Rao et al. | |
| 6,740,861 B2 | 5/2004 | Matsuda | |
| 6,771,614 B1 | 8/2004 | Jones, IV et al. | |
| 6,775,137 B2 | 8/2004 | Chu et al. | |
| 6,778,785 B2 | 8/2004 | Imajo | |
| 6,804,256 B2 | 10/2004 | Chang | |
| 6,804,354 B1 | 10/2004 | Driscoll | |
| 6,807,188 B1 * | 10/2004 | Blahut et al. | 370/442 |
| 6,814,328 B1 | 11/2004 | Li et al. | |
| 6,823,141 B2 * | 11/2004 | Miyauchi et al. | 398/147 |
| 6,823,385 B2 | 11/2004 | McKinnon, III et al. | |
| 6,889,007 B1 | 5/2005 | Wang et al. | |
| 6,895,023 B2 * | 5/2005 | Fice et al. | 370/509 |
| 6,912,075 B1 | 6/2005 | Ionov et al. | |
| 6,961,956 B2 | 11/2005 | Bontempi | |
| 6,973,271 B2 | 12/2005 | Farmer et al. | |
| 6,978,091 B1 * | 12/2005 | Needle | 398/72 |
| 7,007,297 B1 | 2/2006 | Woodward | |
| 7,023,871 B2 | 4/2006 | Lind et al. | |
| 7,043,164 B1 * | 5/2006 | Cotter | 398/175 |
| 7,062,171 B2 * | 6/2006 | Ota et al. | 398/67 |
| 7,190,901 B2 | 3/2007 | Farmer et al. | |
| 7,190,903 B1 * | 3/2007 | Combs et al. | 398/71 |
| 7,218,855 B2 * | 5/2007 | Whittlesey et al. | 398/72 |
| 7,222,358 B2 * | 5/2007 | Levinson et al. | 725/121 |
| 7,227,871 B2 | 6/2007 | Dworkin et al. | |
| 7,242,694 B2 | 7/2007 | Beser | |

(56) References Cited

U.S. PATENT DOCUMENTS

| | | | |
|---|---|---|---|
| 7,277,637 B2 * | 10/2007 | Jette et al. | 398/70 |
| 7,283,749 B1 * | 10/2007 | Combs et al. | 398/72 |
| 7,454,141 B2 * | 11/2008 | Farmer et al. | 398/72 |
| 7,519,078 B2 * | 4/2009 | Oyadomari et al. | 370/465 |
| 7,548,548 B2 * | 6/2009 | Rakib et al. | 370/419 |
| 7,689,128 B2 * | 3/2010 | Williams | 398/164 |
| 7,706,689 B2 * | 4/2010 | Sniezko et al. | 398/72 |
| 7,751,718 B2 * | 7/2010 | Sage | 398/141 |
| 7,986,880 B2 * | 7/2011 | Farmer et al. | 398/72 |
| 8,046,806 B2 * | 10/2011 | Wall et al. | 725/78 |
| 8,156,535 B2 * | 4/2012 | Sage | 725/121 |
| 2001/0002195 A1 | 5/2001 | Fellman et al. | |
| 2001/0002196 A1 | 5/2001 | Fellman et al. | |
| 2001/0002486 A1 | 5/2001 | Kocher et al. | |
| 2001/0004362 A1 | 6/2001 | Kamiya | |
| 2001/0030785 A1 * | 10/2001 | Pangrac et al. | 359/125 |
| 2002/0006197 A1 | 1/2002 | Carroll et al. | |
| 2002/0012138 A1 | 1/2002 | Graves et al. | |
| 2002/0021465 A1 | 2/2002 | Moore, Jr. et al. | |
| 2002/0027928 A1 | 3/2002 | Fang | |
| 2002/0039218 A1 | 4/2002 | Farmer et al. | |
| 2002/0063924 A1 * | 5/2002 | Kimbrough et al. | 359/125 |
| 2002/0089725 A1 | 7/2002 | Farmer et al. | |
| 2002/0105965 A1 | 8/2002 | Dravida et al. | |
| 2002/0106178 A1 | 8/2002 | Bumgarner et al. | |
| 2002/0116719 A1 * | 8/2002 | Dapper et al. | 725/116 |
| 2002/0135843 A1 | 9/2002 | Gruia | |
| 2002/0141159 A1 | 10/2002 | Bloemen | |
| 2002/0164026 A1 | 11/2002 | Huima | |
| 2002/0181925 A1 | 12/2002 | Hodge et al. | |
| 2003/0007210 A1 | 1/2003 | Kenny | |
| 2003/0007220 A1 | 1/2003 | Whittlesey et al. | |
| 2003/0011849 A1 | 1/2003 | Farmer et al. | |
| 2003/0016692 A1 | 1/2003 | Thomas et al. | |
| 2003/0072059 A1 | 4/2003 | Thomas et al. | |
| 2003/0086140 A1 | 5/2003 | Thomas et al. | |
| 2003/0903020 | 5/2003 | Skrobko et al. | |
| 2003/0128983 A1 * | 7/2003 | BuAbbud et al. | 398/71 |
| 2003/0154282 A1 | 8/2003 | Horvitz | |
| 2003/0189587 A1 | 10/2003 | White et al. | |
| 2003/0194241 A1 | 10/2003 | Farmer | |
| 2003/0206564 A1 | 11/2003 | Mills et al. | |
| 2003/0206634 A1 | 11/2003 | Rose | |
| 2003/0223750 A1 | 12/2003 | Farmer et al. | |
| 2004/0086277 A1 | 5/2004 | Kenny | |
| 2004/0131357 A1 | 7/2004 | Farmer et al. | |
| 2004/0141747 A1 | 7/2004 | Kenny et al. | |
| 2004/0161217 A1 | 8/2004 | Hodge et al. | |
| 2004/0199502 A1 | 10/2004 | Wong et al. | |
| 2004/0221088 A1 | 11/2004 | Lisitsa et al. | |
| 2004/0253003 A1 | 12/2004 | Farmer et al. | |
| 2004/0264492 A1 | 12/2004 | Blahut | |
| 2004/0264964 A1 * | 12/2004 | BuAbbud | 398/72 |
| 2004/0267730 A1 | 12/2004 | Dumais et al. | |
| 2005/0053350 A1 | 3/2005 | Hodge et al. | |
| 2005/0074241 A1 | 4/2005 | Farmer et al. | |
| 2005/0081244 A1 | 4/2005 | Barrett et al. | |
| 2005/0123001 A1 | 6/2005 | Craven et al. | |
| 2005/0125837 A1 | 6/2005 | Farmer et al. | |
| 2005/0175035 A1 | 8/2005 | Neely et al. | |
| 2006/0020975 A1 | 1/2006 | Kenny et al. | |
| 2006/0039699 A1 | 2/2006 | Farmer et al. | |
| 2006/0075428 A1 | 4/2006 | Farmer et al. | |
| 2006/0165413 A1 * | 7/2006 | Schemmann et al. | 398/71 |
| 2007/0076717 A1 | 4/2007 | Limb et al. | |

FOREIGN PATENT DOCUMENTS

| | | |
|---|---|---|
| EP | 0713347 A2 | 5/1996 |
| EP | 0720322 A2 | 7/1996 |
| EP | 0 566 662 | 11/1999 |
| EP | 0955739 A2 | 11/1999 |
| EP | 0 933 892 | 10/2003 |
| JP | 7-20327 | 1/1995 |
| JP | 10-20123 | 1/1998 |
| JP | 11-305052 | 11/1999 |
| JP | 4-504433 | 3/2002 |
| MX | 180038 | 11/1995 |
| TW | 72821 | 8/1995 |
| WO | WO 01/27490 A2 | 4/2001 |
| WO | WO 0127940 | 4/2001 |
| WO | WO 02/30019 A3 | 4/2002 |
| WO | WO 02/030019 A3 | 4/2002 |
| WO | WO 02/30020 A2 | 4/2002 |
| WO | WO 02/060123 A2 | 8/2002 |
| WO | WO 03/001737 A3 | 1/2003 |
| WO | WO 03/005611 A2 | 1/2003 |
| WO | WO 03/005612 A1 | 1/2003 |
| WO | WO 03/019243 A2 | 3/2003 |
| WO | WO 03/021820 A1 | 3/2003 |
| WO | WO 03/023980 A2 | 3/2003 |
| WO | WO 03/079567 A1 | 9/2003 |
| WO | WO 03/090396 A2 | 10/2003 |
| WO | WO 2006/014433 A2 | 2/2006 |
| WO | WO 2006/020538 A2 | 2/2006 |
| WO | WO 2006/041784 A2 | 4/2006 |

OTHER PUBLICATIONS

Mangun et al., Fiber to the Home Experience in Southern Bell, BellSouth Services and Northern Telecom, 1988, IEEE, CH2536-1/88/0000-0208, pp. 208-212.

Han et al., Burst-Mode Penalty of AC—Coupled Optical Receivers Optimized for 8B/10B Line Code, 2004, IEEE.

Coppinger et al., Nonlinear Raman Cross-Talk in a Video Overlay Passive Optical Network, 2003, Tuesday Afternoon, OFC 2003, vol. 1, pp. 285-286.

Piehier et al., Nonlinear Raman Crosstalk in a 125-Mb/s CWDM Overlay on a 1310-run Video Access Network, 2003, Optical Society of America.

Wong et al., 50-dB Nonlinear Crosstalk Suppression in a WDM Analog Fiber System by Complementary Modulation and Balanced Detection, 2003, IEEE, pp. 500-505.

Perkins, The Art of Overlaying Video on a BPON, 2004, Bechtel Coorporation, pp. 1-9.

Partial International Search Report dated Jan. 3, 2003 for PCT/US01/31032.

International Search Report dated Apr. 22, 2003 for PCT/US01/50361.

L. Zhang et al., "Label-switching architecture for IP traffic over WDM networks", IEE Proc. Commun., vol. 147, No. 5, Oct. 2000, pp. 269-275.

J. Masip-Torné. et al., "Providing Differentiated Service Categories in Optical Packet Networks", Proceedings of the International Teletraffic Congress. ITC-16, Teletraffic Engineering in a Competitive World. Edinburgh, UK, Jun. 7-11, 1999, Teletraffic Science and Engineering, Amsterdam Elsevier, NL, vol. 3B, Jun. 7, 1999, pp. 1115-1126.

J. Bannister et al., "How Many Wavelengths Do We Really Need? A Study of the Performance Limits of Packet Over Wavelengths", Optical Networks Magazine, SPIE, Bellingham, WA, vol. 1, No. 2, Apr. 2000, pp. 17-28.

O. W.W. Yang, et al., "All-Optical WDM/TDM Star-Bus Network Using Optical Amplifiers", Journal of Optical Communications, Fachverlage Schieke & Schon, Berlin, DE, vol. 16, No. 6, Dec. 1, 1995, pp. 216-226.

Walter Ciciora et al., "Modern Cable Television Technology: Video, Voice, and Data Communications", © 1999 by Morgan Kaufman Publishers, Inc., pp. 167-176.

International Search Report dated Apr. 21, 2003 for PCT/US02/28734.

Written Opinion dated May 6, 2003 for PCT/US01/21298.

Global Access™, Universal Services Gateway, USG100, ARRIS, pp. 1-2, Oct. 18, 2002.

Global Access™, Universal Access Switch, UAS4024, ARRIS, pp. 1-2, Aug. 28, 2002.

International Search Report dated Dec. 4, 2002 for PCT/US02/27398.

(56) References Cited

OTHER PUBLICATIONS

International Search Report dated Dec. 17, 2002 for PCT/US02/15861.
"Trading Update and Operational Review Presentation" Marconi, Sep. 4, 2001, pp. 1-35.
"Cable Market" 2 pgs, Marconi Corporation, PLC, 2000 at www.Marconi.com.
"Communications" 2 pgs, Marconi Corporation, PLC, 2000 at www.Marconi.com.
"Dalton Utilities" 9 pgs, Marconi Corporation, PLC, 2002 at www.Marconi.com.
"Deep Fiber Solutions" 3 pgs, Marconi Corporation, PLC, 2000 at www.Marconi.com.
"Deep Fiber HFC Features and Benefits" 1 pg, Marconi Corporation, PLC, 2002 at www.Marconi.com.
"Deep Fiber HFC Network Diagram" 1 pg, Marconi Corporation, PLC, 2002 at www.Marconi.com.
"Deep Fiber HFC Product Overview: New FITL Configuration" 2 pgs, Marconi Corporation, PLC, 2002 at www.Marconi.com.
"Deep Fiber HFC Technical Specifications" 2 pgs, Marconi Corporation, PLC, 2002 at www.Marconi.com.
"Deep Fiber HFC—New FITL Configuration" 1 pg, Marconi Corporation, PLC, 2002 at www.Marconi.com.
"En-Touch" at 5 pgs, Marconi Corporation, PLC, 2002 www.Marconi.com.
"Deep Fiber HFC" Marconi Corporation PLC 2000, pp. 1-2.
"Integrated Voice, Video and Data Services Over a Single Fiber: A Compelling Opportunity for Cable 0perators" Marconi Corporation PLC, May 2000, 6 pgs.
"Deep Fiber Solutions: Advanced Broadband Services" Marconi Corporation PLC, May 2000, 5pgs.
"Deep Fiber HFC: A Next-Generation Integrated Access Solution Offering Significant Improvement Over Traditional HFC Architectures" Marconi Corporation PLC, May 2000, 8pgs.
"A Gold Mine of Opportunities in the Face of Increasing Competition: Choices for Utilities Entering the Communications Marketplace" Marconi Corporation PLC, May 2000, 6pgs.
"Fiber Optics on New Development MDUs: A Research Summary," Marconi Corporation PLC, May 2000, 5pgs.
"Thermal Management Challenges: Small ONU Enclosures," Marconi Corporation PLC, May 2000, 9pgs.
"Passive Optical Networks—Is There Light at the End of the Access Tunnel?" CIBC World Markets Inc., Jan. 11, 2001, pp. 1-66.
"36.2.4 8B/10B transmission code", IEEE 2000, pp. 966-969.
G. Khoe et at., "Coherent Multicarrier Technology for Implementation in the Customer Access." IEEE May/Jun. 1993, pp. 695-713.
L. Linriell. "A Wide-Band Local Access System Using Emerging-Technology Components," IEEE, Jul. 1986, pp. 612-618.
"Digital Broadband Delivery System: Out of Band Transport—Mode B," Society of Cable Telecommunications Engineers, Inc., Aug. 10, 1998, 76 pgs.
Bourne, John et al., "Heathrow—Experience and Evolution" IEEE, 1990, pp. 1091-1095.
Miki, Tetsuya et al., "A Design Concept on Fiber-Optic Wavelength-Division-Multiplexing Subscriber Loop System" WTG—Fachber. 1980, pp. 41-45.
Yamaguchi, K. et al., "A Broadband Access Network Based on Optical Signal Processing: The Photonic Highway" IEEE, 1990, pp. 1030-1037.
International Search Report of Jul. 7, 2003 for PCT/US01/51350.
Angelopoulos, J.D. et al., "A Transport Mac Method for Bandwidth Sharing and CDV Control at the ATM Layer of Passive Optical Networks" Journal of Lightwave Technology, IEEE, 1996, pp. 2623-2634.
International Search Report of Jul. 2, 2003 for PCT/US03/07814.
International Search Report of Oct. 3, 2003 for PCT/US03/12231.
Ciciora, Walter S. et al., "Modern Cable Television Technology: Video, Voice, and Data Communications", ©1999, pp. 162-241, Chapter 4, Morgan Kaufmann Publishers, Inc., San Francisco, California.

Glaesemann, G. Scott et al., "The Mechanical Reliability of Corning® Optical Fiber in Bending White Paper", Sep. 2002, pp. 1-4.
Corning® SMF-28™ Optical Fiber Product Information, "Corning® Single-Mode Optical Fiber", Apr. 2002, pp. 1-4.
CEDaily Direct News, "Today's Report", Mar. 19, 2001, pp. 1-5.
Lucent Technologies, "Lucent Technologies Introduces Single-Fiber Network Access Devices for Voice, Video, and Data Services to the Home or Curb", Jun. 6, 2000, pp. 1-2.
Lucent Technologies, "Agere Systems Introduces Single-Fiber Network Access Devices for Voice, Video and Data Services to the Home or Curb", Mar. 19, 2001, pp. 1-3.
Optical Networks Daily, a Publication of Optical Keyhole, Aug. 26, 2003, pp. 1-13.
Digital Broadband Delivery System: Out of Band Target—Mode A *Society of Cable Telecommunications Engineers, Inc.* pp. 1-76 Aug. 26, 2998.
Digital Broadband Delivery System: Out of Band Transport—Mode B *Society of Cable Telecommunications Engineers, Inc.* pp. 1-49 Aug. 10, 1998.
Policing and Shaping Overview *Quality of Solutions Configuration Guide* pp. 87-98
Cisco IOS (TM) Software—Quality of Service Solutions *Cisco Systems*pp. 1-28 Jan. 1, 1998.
Spectral Grids for WDM Applications: CWDM Wavelength Grib *International Telecommunications Union* pp. 1-111 and 1-4 Dec. 1, 2003.
PCT International Preliminary Report—PCT/US01/51350 pp. 1-5 Apr. 11, 2005.
PCT International Preliminary Exam Report—PCT/US03/12231 pp. 1-6 Sep. 17, 2004.
PCT International Preliminary Report—PCT/US03/07814 pp. 1-3 Nov. 19, 2003.
PCT International Search Report—PCT/US02/03056 pp. 1-3 Jun. 12, 2002.
PCT International Search Report—PCT/US01/21298 pp. 1-3 Jun. 17, 2002.
PCT Partial International Search Report—PCT/US01/31032 pp. 1-2 Jan. 3, 2003.
PCT International Search Report—PCT/US01/50361 pp. 1-3 Apr. 22, 2003.
PCT International Search Report—PCT/US05/23847 pp. 1 Apr. 18, 2006.
PCT International Search Report—PCT/US05/28020 pp. 1 Nov. 8, 2006.
PCT International Search Report—PCT/US05/46419 pp. 1 Feb. 14, 2007.
PCT International Seach Report—PCT/US06/11159 pp. 1 Feb. 21, 2007.
PCT International Search Report—PCT/US05/35512 pp. 1 Oct. 25, 2006.
PCT Written Opinion—PCT/US01/21298 pp. 1 May 6, 2003.
CIBC World Markets Equity Research—Photonics—Passive Optical Networks—Is There Light at the End of the Access Tunnel pp. 1-66 Jan. 11, 2011.
Effenberger G.983 Video Return Path *International Telecommunications Union* pp. 1-18 Oct. 1, 2004.
Fludger et al. Pump to Signal RIN Transfer in Raman Fiber Amplifiers *Journal of Lightwave Technology* vol. 19 Iss: (8) pp. 1140-1148 Aug. 1, 2001.
Gaglianello et al. An Effecient MAC Layer Protocol for EPON *IEEE 802.3 EFM* pp. 1-9 Nov. 1, 2001.
IEEE 36.2.4 8B/10B Transmission Code pp. 966-969 Jan. 1, 2000.
Khoe et al. Coherent Multicarrier Technology for Implementation in the Customer Access *IEEE* pp. 695-713 May 1, 1993.
Linnell. L.R. A Wide-Band Local Access System Using Emerging-Technology Components *IEEE Journal on Selected Areas of Communications* vol SAC-4 pp. 612-618 Jul. 1, 1986.
Marconi Corporation Deep Fiber HFC Features and Benefits pp. 1-2 Feb. 25, 2002.
Marconi Corporation Deep Fiber HFC Network Diagram pp. 1 Jan. 1, 2002.
Marconi Corporation Deep Fiber HFC Product Overview pp. 1-2 Feb. 25, 2002.

(56) References Cited

OTHER PUBLICATIONS

Marconi Corporation Deep Fiber HFC Technical Specifications pp. 1-2 Feb. 25, 2002.
Marconi Corporation Deep Fiber HFC—New FITL Configuration pp. 1 Feb. 25, 2002.
Marconi Corporation En-Touch pp. 1-5 Feb. 25, 2002.
Marconi Corporation Deep Fiber HFC pp. 102 Jan. 1, 2000.
Marconi Corporation Integrated Voice, Video and Data Services Over a Single Fiber pp. 1-6 May 1, 2000.
Marconi Corporation Deep Fiber Solutions—Advanced Broadband Services pp. 1-5 May 1, 2000.
Marconi Corporation Deep Fiber HFC—A Next-Generation Intergrated Access Solution Offering Significant Improvement Over Traditional HFC Architectures pp. 1-8 May 1, 2000.
Marconi Corporation A Gold Mine of Opportunities in the Face of Increasing Competition pp. 1-6 May 1, 2000.
Marconi Corporation Fiber Optics on New Development MDUs pp. 1-5 May 1, 2000.
Marconi Corporation Thermal Management Challenges—Small ONU Enclosures pp. 1-9 May 1, 2000.
The International Engineering Corporation Marconi—Fiber to the Home www.iec.org pp. 1-10
Tian et al. Raman Crosstalk in Fiber-Optic Hybrid CATV Systems with Wide Channel Separations *IEEE Photonics Technology Letters* vol. 16 Iss: (1) pp. 344-346 Jan. 1, 2004.
Zhang et al. Label-Switching Architecture for IP Traffic over WDM Networks *IEE Proc-Commun.* vol. 147 Iss:(5) pp. 269-276 Oct. 1, 2000.

\* cited by examiner

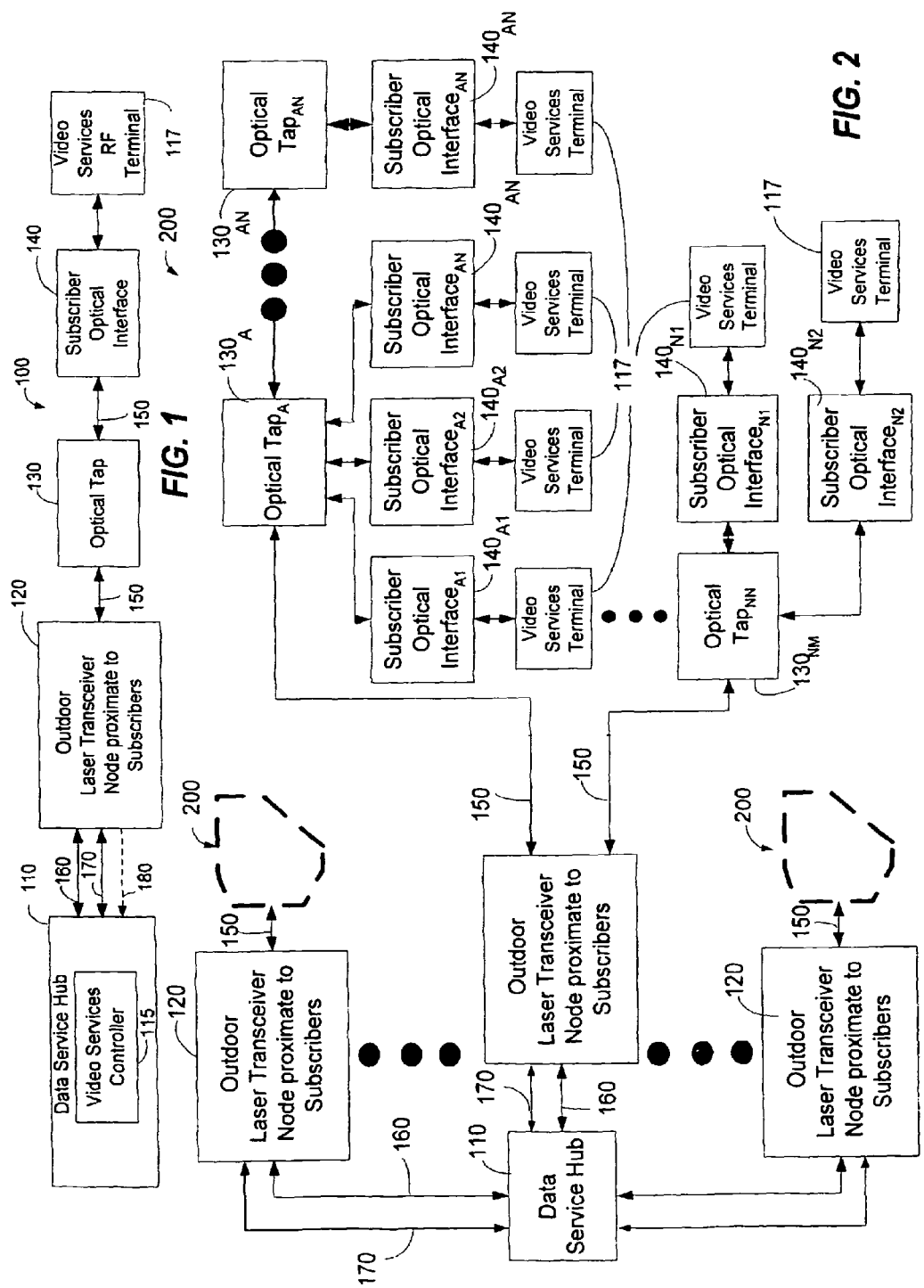

Subscriber Optical Interface 140

Subscriber Optical Interface 140

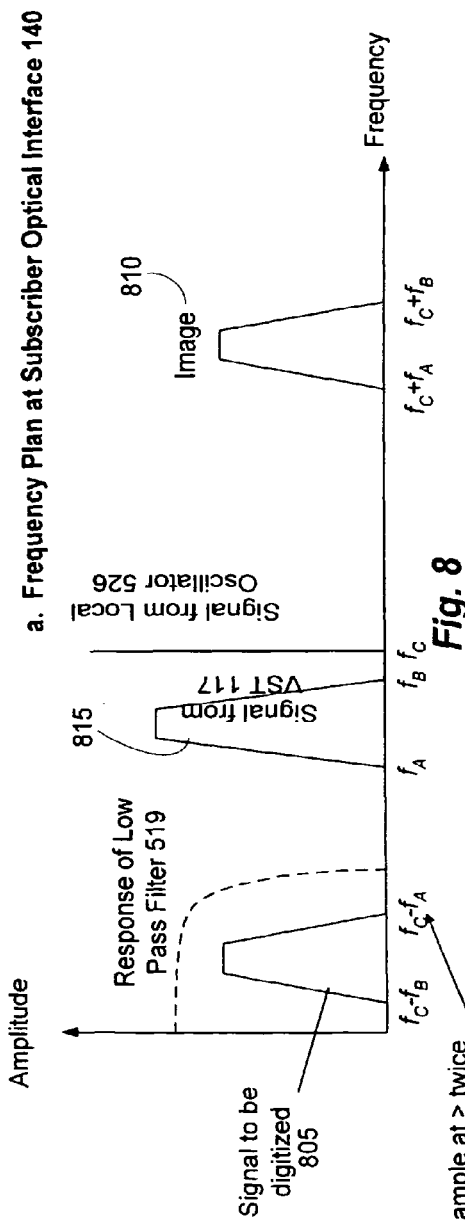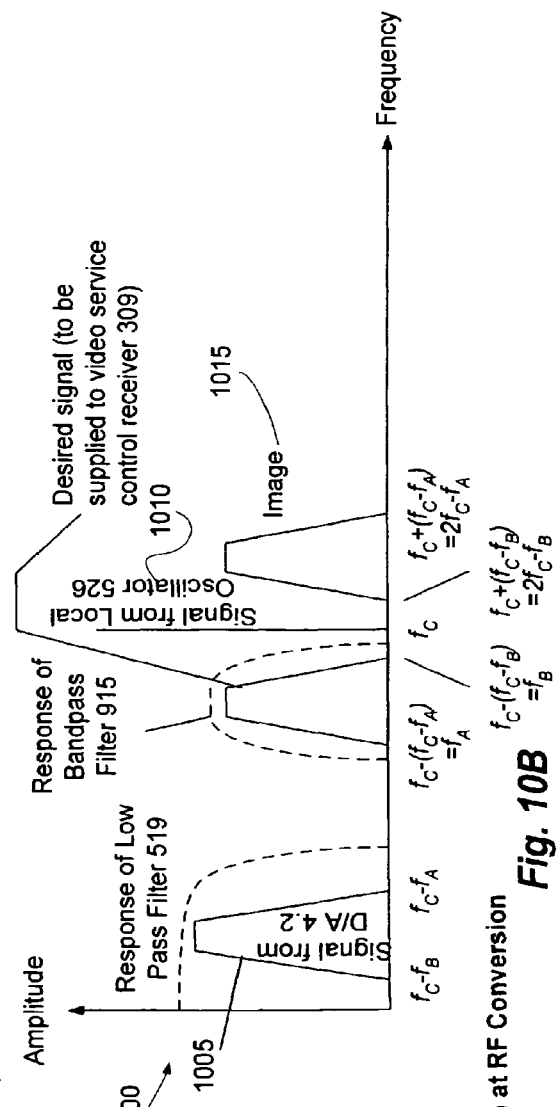

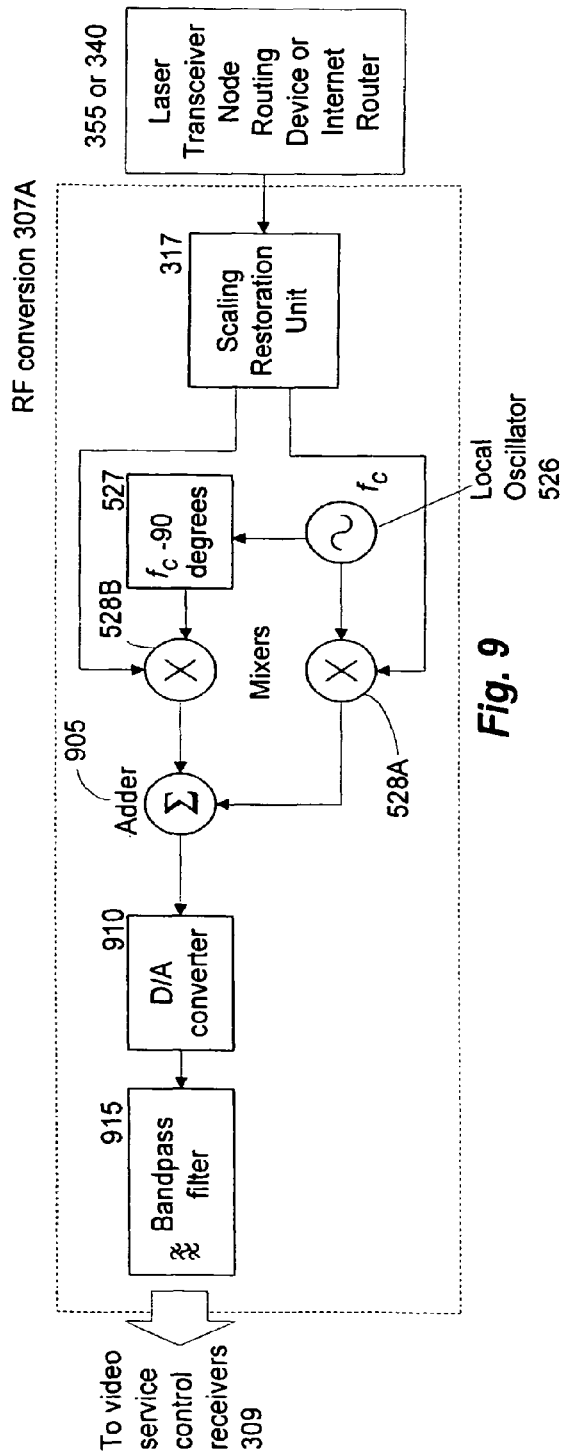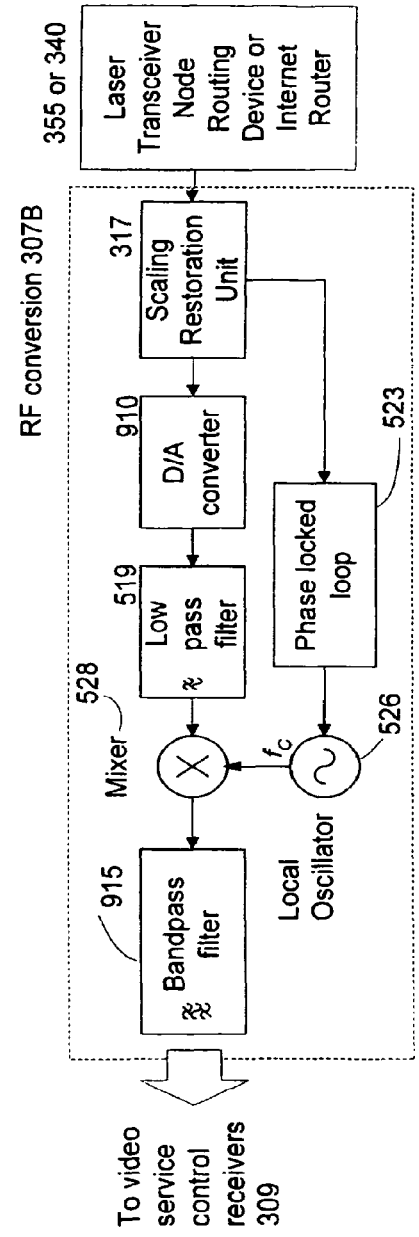
Fig. 9
Fig. 10A

METHOD AND SYSTEM FOR PROVIDING A RETURN PATH FOR SIGNALS GENERATED BY LEGACY TERMINALS IN AN OPTICAL NETWORK

STATEMENT REGARDING PRIORITY AND RELATED APPLICATIONS

This application is a continuation of and claims priority to application Ser. No. 12/287,720 filed Oct. 10, 2008, now U.S. Pat. No. 7,986,880 entitled "Method and System for Providing a Return Path for Signals Generated by Legacy Terminals in an Optical Network," the entire contents of which are incorporated by reference.

TECHNICAL FIELD

The present invention relates to video, voice, and data communications. More particularly, the present invention relates to a fiber-to-the-home (FTTH) system that is capable of propagating RF terminal signals from a subscriber to a data service provider.

BACKGROUND OF THE INVENTION

The increasing reliance on communication networks to transmit more complex data, such as voice and video traffic, is causing a very high demand for bandwidth. To resolve this demand for bandwidth, communications networks are relying upon optical fiber to transmit this complex data. Conventional communication architectures that employ coaxial cables are slowly being replaced with communication networks that comprise only fiber optic cables. One advantage that optical fibers have over coaxial cables is that a much greater amount of information can be carried on an optical fiber.

While the FTTH optical network architecture has been a dream of many data service providers because of the aforementioned capacity of optical fibers, implementing the FTTH optical network architecture may encounter some problems associated with legacy systems that are in current use by subscribers. For example, many subscribers of data service providers use set top terminals (STTs) to receive and transmit information related to video services. The conventional set top terminals are coupled to a coaxial cable. The coaxial cable, in turn, is then connected to fiber optic cables in a hybrid fiber-coax (HFC) system. The coaxial cable from the set top terminals in combination with the fiber optic cables provide a two way communication path between the set top terminal and the data service hub for purposes such as authorizing a subscriber to view certain programs and channels.

For example, conventional set top terminals coupled to coaxial cables may provide impulse pay-per-view services. Impulse pay-per-view services typically require two way communications between the set top terminal and the data service provider. Another exemplary service that may require two-way communication passed between the set top terminal and the data service provider is video-on-demand (VOD) services.

For video on demand services, a subscriber can request a program of his choosing to be played at a selected time from a central video file server at the data service hub. The subscriber's VOD program request is transmitted upstream on a return channel that comprises coaxial cables coupled to fiber optic cables. With the VOD service, a subscriber typically expects VCR-like control for these programs which includes the ability to "stop" and "play" the selected program as well as "rewind" and "fast forward" the program.

In conventional HFC systems, a return RF path from the subscriber to the data service hub is provided. The RF return path is needed because a conventional set top terminal usually modulates its video service upstream data onto an analog RF carrier. While the video service upstream data may be modulated onto an RF carrier, it is recognized that the upstream data may be in digital form.

An RF return path typically comprises two-way RF distribution amplifiers with coaxial cables and two-way fiber optic nodes being used to interface with fiber optic cables. A pair of fiber optic strands can be used to carry the radio frequency signals between the head end and node in an analog optical format. Each optical cable of the pair of fiber optic strands carries analog RF signals: one carries analog RF signals in the downstream direction (toward the subscriber) while the other fiber optic cable carries analog RF signals in the reverse or upstream direction (from the subscriber). In a more recent embodiment, the upstream spectrum (typically 5-42 MHz in North America) is digitized at the node. The digital signals are transmitted to the headend, where they are converted back to the analog RF spectrum of 5-42 MHz. This process typically uses high data rates (at least 1.25 Gb/s) and a fiber or wavelength dedicated to return traffic from one or two nodes.

Unlike HFC systems, conventional FTTH systems typically do not comprise a return RF path from the subscriber to the data service hub because most of the return paths comprise only fiber optic cables that propagate digital data signals as opposed to analog RF signals. In conventional FTTH systems, a downstream RF path is usually provided because it is needed for the delivery of television programs that use conventional broadcast signals. This downstream RF path can support RF modulated analog and digital signals as well as RF modulated control signals for any set top terminals that may be used by the subscriber. However, as noted above, conventional FTTH systems do not provide for any capability of supporting a return RF path for RF analog signals generated by the legacy set top terminal.

Accordingly, there is a need in the art for the system and method for communicating optical signals between a data service provider and a subscriber that eliminates the use of the coaxial cables and the related hardware and software necessary to support the data signals propagating along the coaxial cables. There is also a need in the art for a system and method that provides a return path for RF signals that are generated by legacy video service terminals. An additional need exists in the art for a method and system for propagating upstream RF packets with very low latency and jitter. A further need exists in the art for a method in system for communicating optical signals between a data service provider and a subscriber that can support either a query-response protocol or a contention protocol. Another need exists in the art for supporting legacy video service controllers and terminals with an all optical network architecture.

SUMMARY OF THE INVENTION

The present invention is generally drawn to a system and method for efficient propagation of data and broadcast signals over an optical fiber network. More specifically, the present invention is generally drawn to an optical network architecture that can provide a return path for RF signals that are generated by existing legacy video service terminals. Video service terminals can comprise set top terminals or other like communication devices that may employ RF carriers to transmit upstream information.

In one exemplary embodiment, a portion of the return path may be housed in a subscriber optical interface. The subscriber optical interface may comprise an analog to digital converter where analog RF electrical signals produced by a video service terminal are converted to digital electrical signals.

The return path in the subscriber optical interface may further comprise a data scaler that shortens or reduces the size of the digitized RF electrical signals. A data conditioner can be coupled to the data reducer for generating identification information that is linked to the digitized and reduced RF signals to form RF packets. That is, an RF packet can comprise digitized and reduced RF signals that are coupled with identification information generated by the data conditioner. According to a preferred and an exemplary embodiment, the RF packets are formatted as Ethernet packets. However, other packet formats are not beyond the scope and spirit of the present invention.

The data conditioner may further comprise a buffer such as a FIFO for speeding up the transmission rate of the RF packets. This increase in transmission rate of the RF packets is an important feature of the present invention. A switch connected to the data conditioner and processor can be controlled by the processor of the subscriber optical interface. The switch may be activated at appropriate times to combine the RF packets with data signals destined for a data service hub.

More specifically, the RF packets may be inserted between upstream packets comprising data generated by a subscriber with a communication device such as a computer or internet telephone. The term "upstream" can define a communication direction where a subscriber originates a data signal that is sent upwards towards a data service hub of an optical network. Conversely, the term "downstream" can define a communication direction where a data service hub originates a data signal that is sent downwards towards subscribers of an optical network.

The present invention can provide an RF return path for legacy video service terminals that use either a query-response protocol or a contention protocol. In other words, the present invention can support video service terminals in which the timing of upstream RF signals to the video service controllers is not critical, such as in the Digital Video Services (DVS) Standard 178. In the query-response protocol, the data service hub or headend communicates with a particular subscriber optical interface that has a set top terminal and waits for a response from the set top terminal. In the contention protocol, a set top terminal wanting to send data to the data service hub contends with all set top terminals for the right to send its information. When a set top terminal is successful, the data service hub acknowledges the set top terminal's request and the set top terminal can then transmit its information to the data service hub. This type of protocol is often referred to as the aloha protocol.

In one exemplary embodiment of the present invention, the subscriber optical interface converts upstream analog RF signals from the set top terminal into digitized RF Signals. First, the analog signals from the legacy terminal are filtered with a low pass filter that can part of a diplexer. Then the RF signals are converted into digital signals. The digital signals can be split into two data streams. A first data stream can be mixed down to a zero frequency.

This mixing process can be driven by a local oscillator which can be frequency controlled from a phase locked loop (PLL). The frequency of the PLL can be determined by measuring the frequency of the RF signal passing out of the low pass filter. The local oscillator can be set to this measured frequency. The measured frequency can be calculated by measuring the time between a plurality of zero crossings of the digitized RF signal.

A second data stream can be mixed with the carrier signal that is at the same frequency as the first carrier or local oscillator signal, but phased ninety degrees apart from the first oscillator signal. The first and second data streams can then be scaled down in order to reduce the amount of digitized RF data transmitted. The first and second data streams can then be multiplexed into a single upstream digital signal that is propagated to a laser transceiver node and later to a data service hub.

In another exemplary embodiment of the present invention, the subscriber optical interface can determine a control word for a phase locked loop. The control word is loaded into the phase lock loop to establish a frequency of an oscillator. In this embodiment, the local oscillator frequency can be determined by measuring the frequency of the incoming RF signal flowing out of the law pass filter. The measured frequency can be calculated by measuring the time between a plurality of zero crossings of the RF signal. Once the measured frequency is determined, then an offset frequency can be added to the measured frequency such that the RF signal has side bands that extend near, but do not cross, a zero frequency value. The analog signal from the local oscillator is mixed with the analog RF return signal generated by a set top terminal to produce a difference frequency. The difference frequency is converted to the digital domain. The digital signals are then scaled down to reduce the amount of RF data transmitted and the scaled or reduced digital signals are then transmitted upstream to the laser transceiver node, and later to the data service hub.

A data service hub may comprise another portion of the RF return path. The RF packets bearing the digitized RF signal can then be converted back to the electrical domain with an optical receiver, along with all other non-RF return data present in the packets. The RF return packets may be separated from other upstream packets by either a laser transceiver node routing device or an internet router, depending how the data service hub is configured. The RF packet may then be expanded with a data to RF converter that transforms the RF packet back to its original analog RF signal format. An RF receiver coupled to a video service controller may then process the restored analog RF signals.

BRIEF DESCRIPTION OF THE DRAWINGS

FIG. 1 is a functional block diagram of some core components of an exemplary optical network architecture according to an exemplary embodiment of the present convention that can support legacy video services.

FIG. 2 is a functional block diagram illustrating additional aspects of an exemplary optical network architecture according to an exemplary embodiment of the present invention.

FIG. 8 is a graph illustrating a frequency plan for a subscriber optical interface according to one exemplary embodiment of the present invention.

FIG. 9 is a functional block diagram illustrating some components of data-to-RF conversion block according to one preferred exemplary embodiment of the present invention.

FIG. 10A is a functional block diagram illustrating some components of data-to-RF conversion block according to an alternate exemplary embodiment of the present invention.

FIG. 10B is a graph illustrating a frequency plan for a data service hub according to one exemplary embodiment of the present invention.

DETAILED DESCRIPTION OF EXEMPLARY EMBODIMENTS OF THE INVENTION

Figure 3:
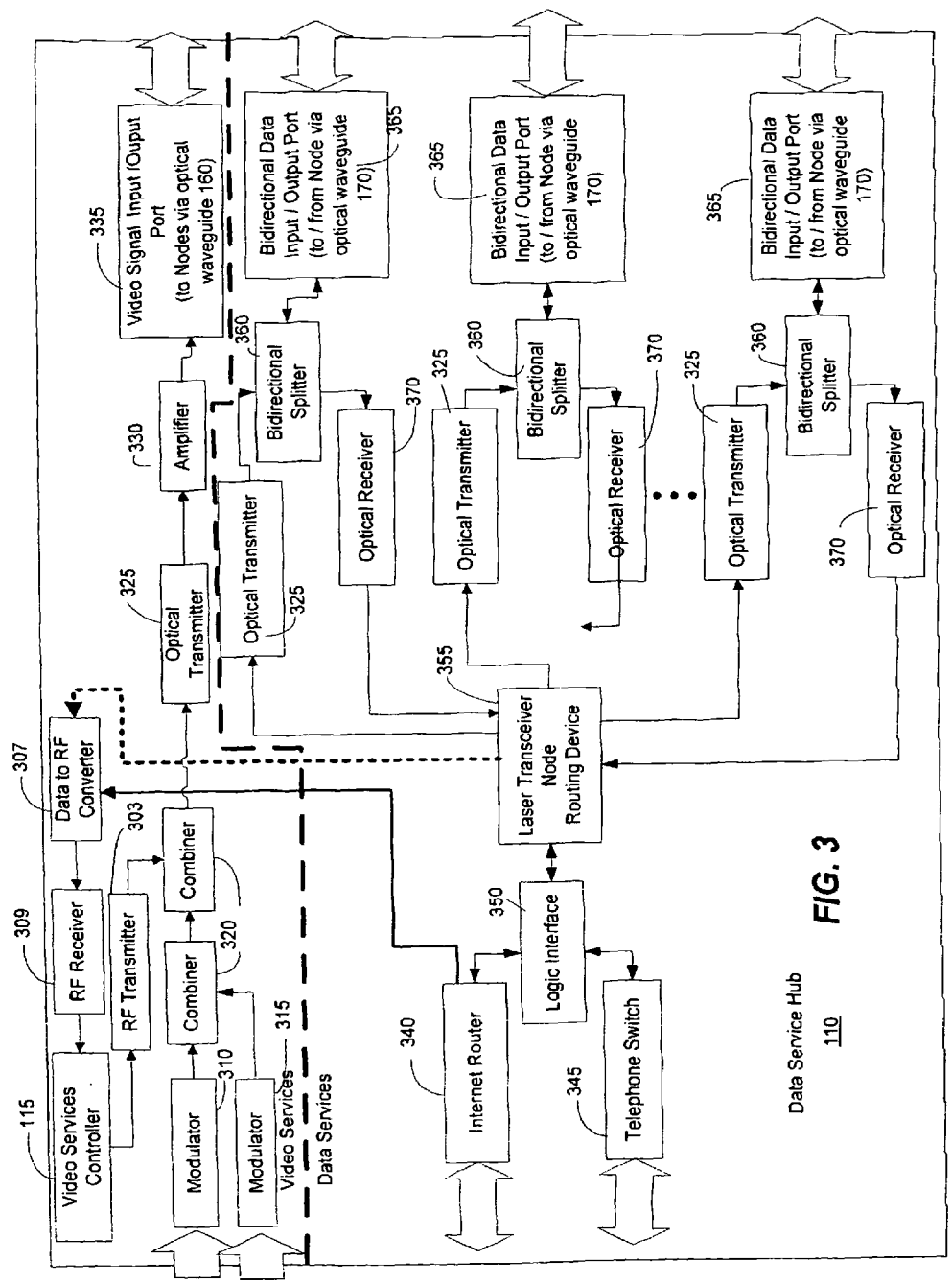
FIG. 3 is a functional block diagram illustrating an exemplary data service hub according to an exemplary embodiment of the present invention.

The present invention may be embodied in hardware or software or a combination thereof disposed within an optical network. In one exemplary embodiment, the present invention provides a method for inserting RF packets between upstream packets comprising data generated by a subscriber with a communication device such as a computer or internet telephone. In this way, the present invention can provide an RF return path for legacy video service terminals that shares a return path for regular data packets in an optical network architecture. Video service terminals can comprise set top terminals or other like communication devices that may employ RF carriers to transmit upstream information.

Referring now to the drawings, in which like numerals represent like elements throughout the several Figures, aspects of the present invention and the illustrative operating environment will be described.

FIG. 1 is a functional block diagram illustrating an exemplary optical network architecture 100 according to the present invention. The exemplary optical network architecture 100 comprises a data service hub 110 that houses a legacy video services controller 115. The legacy video services controller 115 is typically designed to transmit and receive digital radio-frequency (RF) signals. The legacy video services controller 115 can comprise conventional hardware that supports services such as impulse-pay-per-view and video-on-demand. However, the video services controller 115 is not limited to the aforementioned applications and can include other applications that are not beyond the scope and spirit of the present invention. In some exemplary embodiments, the video services controller can be split between two locations. For example, a portion, primarily a computer, can be located in a first data service hub 110 that services a plurality of second data service hubs 110, while an RF transmitter plus one or more receivers can be located in each second data service hub 110. The first and plurality of second data service hubs 110 can be linked using any of several known communications paths and protocols.

The data service hub 110 is connected to a plurality of outdoor laser transceiver nodes 120. The laser transceiver nodes 120, in turn, are each connected to a plurality of optical taps 130. The optical taps 130 can be connected to a plurality of subscriber optical interfaces 140. Connected to each subscriber optical interface 140 can be video services terminal (VST) 117. The video services RF terminal 117 is designed to work with the video services controller 115. The video services RF terminal 117 can receive control signals from the video services controller 115 and can transmit RF-modulated digital signals back to the video services controller 115. The RF-modulated digital signals may comprise the options selected by a user. However, the signals produced by the video service terminal 117 could be analog in form and then modulated onto the RF carrier. But most legacy video service terminals 117 as of the writing of this description produce digital signals that are modulated onto an analog RF carrier.

The video services terminal 117 can permit a subscriber to select options that are part of various exemplary video services such as impulse-pay-per-view and video-on-demand. However, as noted above with respect to the video services controller 115, the present invention is not limited to the aforementioned applications and can include numerous other applications where RF analog signals are used to carry information back to the video services controller 115.

Between respective components of the exemplary optical network architecture 100 are optical waveguides such as optical waveguides 150, 160, 170, and 180. The optical waveguides 150-180 are illustrated by arrows where the arrowheads of the arrows illustrate exemplary directions of data flow between respective components of the illustrative and exemplary optical network architecture 100. While only an individual laser transceiver node 120, an individual optical tap 130, and an individual subscriber optical interface 140 are illustrated in FIG. 1, as will become apparent from FIG. 2 and its corresponding description, a plurality of laser transceiver nodes 120, optical taps 130, and subscriber optical interfaces 140 can be employed without departing from the scope and spirit of the present invention. Typically, in many of the exemplary embodiments of the RF return system of the present invention, multiple subscriber optical interfaces 140 are connected to one or more optical taps 130.

The outdoor laser transceiver node 120 can allocate additional or reduced bandwidth based upon the demand of one or more subscribers that use the subscriber optical interfaces 140. The outdoor laser transceiver node 120 can be designed to withstand outdoor environmental conditions and can be designed to hang on a strand or fit in a pedestal or "hard hole." The outdoor laser transceiver node can operate in a temperature range between minus 40 degrees Celsius to plus 60 degrees Celsius. The laser transceiver node 120 can operate in this temperature range by using passive cooling devices that do not consume power.

Unlike the conventional routers disposed between the subscriber optical interface 140 and data service hub 110, the outdoor laser transceiver node 120 does not require active cooling and heating devices that control the temperature surrounding the laser transceiver node 120. The RF system of the present invention attempts to place more of the decision-making electronics at the data service hub 110 instead of the laser transceiver node 120. Typically, the decision-making electronics are larger in size and produce more heat than the electronics placed in the laser transceiver node of the present invention. Because the laser transceiver node 120 does not require active temperature controlling devices, the laser transceiver node 120 lends itself to a compact electronic packaging volume that is typically smaller than the environmental enclosures of conventional routers. Further details of the components that make up the laser transceiver node 120 will be discussed in further detail below with respect to FIGS. 5, 6, and 7.

In one exemplary embodiment of the present invention, three trunk optical waveguides 160, 170, and 180 (that can comprise optical fibers) can propagate optical signals from the data service hub 110 to the outdoor laser transceiver node 120. It is noted that the term "optical waveguide" used in the present application can apply to optical fibers, planar light guide circuits, and fiber optic pigtails and other like optical waveguide components that are used to form an optical architecture.

A first optical waveguide 160 can carry downstream broadcast video and control signals generated by the video services controller 115. The signals can be carried in a traditional cable television format wherein the broadcast signals are modulated onto carriers, which in turn, modulate an optical transmitter (not shown in this Figure) in the data service hub 110. The first optical waveguide 160 can also carry upstream RF signals that are generated by respective video service terminals 117. Further details of the format of the upstream RF signals will be discussed below.

A second optical waveguide 170 can carry upstream and downstream targeted services such as data and telephone services to be delivered to or received from one or more subscriber optical interfaces 140. In addition to carrying subscriber-specific optical signals, the second optical waveguide 170 can also propagate internet protocol broadcast packets, as is understood by those skilled in the art.

In one exemplary embodiment, a third optical waveguide 180 can transport data signals upstream from the outdoor laser transceiver node 120 to the data service hub 110. The optical signals propagated along the third optical waveguide 180 can also comprise data and telephone services received from one or more subscribers. Similar to the second optical waveguide 170, the third optical waveguide 180 can also carry IP broadcast packets, as is understood by those skilled in the art.

The third or upstream optical waveguide 180 is illustrated with dashed lines to indicate that it is merely an option or part of one exemplary embodiment according to the present invention. In other words, the third optical waveguide 180 can be removed. In another exemplary embodiment, the second optical waveguide 170 propagates optical signals in both the upstream and downstream directions as is illustrated by the double arrows depicting the second optical waveguide 170.

In such an exemplary embodiment where the second optical waveguide 170 propagates bidirectional optical signals, only two optical waveguides 160, 170 would be needed to support the optical signals propagating between the data server's hub 110 in the outdoor laser transceiver node 120. In another exemplary embodiment (not shown), a single optical waveguide can be the only link between the data service hub 110 and the laser transceiver node 120. In such a single optical waveguide embodiment, three different wavelengths can be used for the upstream and downstream signals. Alternatively, bi-directional data could be modulated on one wavelength.

In one exemplary embodiment, the optical tap 130 can comprise an 8-way optical splitter. This means that the optical tap 130 comprising an 8-way optical splitter can divide downstream optical signals eight ways to serve eight different subscriber optical interfaces 140. In the upstream direction, the optical tap 130 can combine the optical signals received from the eight subscriber optical interfaces 140.

In another exemplary embodiment, the optical tap 130 can comprise a 4-way splitter to service four subscriber optical interfaces 140. Yet in another exemplary embodiment, the optical tap 130 can further comprise a 4-way splitter that is also a pass-through tap meaning that a portion of the optical signal received at the optical tap 130 can be extracted to serve the 4-way splitter contained therein while the remaining optical energy is propagated further downstream to another optical tap or another subscriber optical interface 140. The present invention is not limited to 4-way and 8-way optical splitters. Other optical taps having fewer or more than 4-way or 8-way splits are not beyond the scope of the present invention.

Referring now to FIG. 2, this Figure is a functional block diagram illustrating an exemplary optical network architecture 100 that further includes subscriber groupings 200 that correspond with a respective outdoor laser transceiver node 120. FIG. 2 illustrates the diversity of the exemplary optical network architecture 100 where a number of optical waveguides 150 connected between the outdoor laser transceiver node 120 and the optical taps 130 is minimized. FIG. 2 also illustrates the diversity of subscriber groupings 200 that can be achieved with the optical tap 130.

Each optical tap 130 can comprise an optical splitter. The optical tap 130 allows multiple subscriber optical interfaces 140 to be coupled to a single optical waveguide 150 that is connected to the outdoor laser transceiver node 120. In one exemplary embodiment, six optical fibers 150 are designed to be connected to the outdoor laser transceiver node 120. Through the use of the optical taps 130, sixteen subscribers can be assigned to each of the six optical fibers 150 that are connected to the outdoor laser transceiver node 120.

In another exemplary embodiment, twelve optical fibers 150 can be connected to the outdoor laser transceiver node 120 while eight subscriber optical interfaces 140 are assigned to each of the twelve optical fibers 150. Those skilled in the art will appreciate that the number of subscriber optical interfaces 140 assigned to a particular waveguide 150 that is connected between the outdoor laser transceiver node 120 and a subscriber optical interface 140 (by way of the optical tap 130) can be varied or changed without departing from the scope and spirit of the present invention. Further, those skilled in the art recognize that the actual number of subscriber optical interfaces 140 assigned to the particular fiber optic cable is dependent upon the amount of power available on a particular optical fiber 150.

As depicted in subscriber grouping 200, many configurations for supplying communication services to subscribers are possible. For example, while optical tap $130_A$ can connect subscriber optical interfaces $140_{A1}$ through subscriber optical interface $140_{AN}$ to the outdoor laser transmitter node 120, optical tap $130_A$ can also connect other optical taps 130 such as optical tap $130_{AN}$ to the laser transceiver node 120. The combinations of optical taps 130 with other optical taps 130 in addition to combinations of optical taps 130 with subscriber optical interfaces 140 are limitless. With the optical taps 130, concentrations of distribution optical waveguides 150 at the laser transceiver node 120 can be reduced. Additionally, the total amount of fiber needed to service a subscriber grouping 200 can also be reduced.

With the active laser transceiver node 120 of the present invention, the distance between the laser transceiver node 120 and the data service hub 110 can comprise a range between 0 and 80 kilometers. However, the present invention is not limited to this range. Those skilled in the art will appreciate that this range can be expanded by selecting various off-the-shelf components that make up several of the devices of the present system.

Those skilled in the art will appreciate that other configurations of the optical waveguides disposed between the data service hub 110 and outdoor laser transceiver node 120 are not beyond the scope of the present invention. Because of the bi-directional capability of optical waveguides, variations in the number and directional flow of the optical waveguides disposed between the data service hub 110 and the outdoor laser transceiver node 120 can be made without departing from the scope and spirit of the present invention.

Referring now to FIG. 3, this functional block diagram illustrates an exemplary data service hub 110 of the present invention. The exemplary data service hub 110 illustrated in FIG. 3 is designed for a two trunk optical waveguide system. That is, this data service hub 110 of FIG. 3 is designed to send and receive optical signals to and from the outdoor laser transceiver node 120 along the first optical waveguide 160 and the second optical waveguide 170. With this exemplary embodiment, both the first optical waveguide 160 and the second optical waveguide 170 support bi-directional data flow. In this way, the third optical waveguide 180 discussed above is not needed.

The data service hub 110 can comprise one or more modulators 310, 315 that are designed to support television broadcast services. The one or more modulators 310, 315 can be analog or digital type modulators. In one exemplary embodiment, there can be at least 78 modulators present in the data service hub 110. Those skilled in the art will appreciate that the number of modulators 310, 315 can be varied without departing from the scope and spirit of the present invention.

The signals from the modulators 310, 315 are combined in a first combiner 320A. The control signals from the video services controller 115 are modulated on an RF carrier by an RF transmitter 303. The RF transmitter 303 feeds its downstream analog RF electrical signals into a second combiner 320B where the electrical signals from the two modulators 310, 315 are combined. The combined video services controller signals and broadcast video signals are supplied to an optical transmitter 325 where these signals are converted into optical form.

Those skilled in the art will recognize that a number of variations of this signal flow are possible without departing from the scope and spirit of the present invention. For example, the two combiners 320A and 320B may actually be one and the same combiner. Also, video signals may be generated at another data service hub 110 and sent to the data service hub 110 of FIG. 3 using any of a plurality of different transmission methods known to these skilled in the art. For example, some portion of the video signals may be generated and converted to optical form at a remote first data service hub 110. At a second data service hub 110, they may be combined with other signals generated locally.

The optical transmitter 325 can comprise one of Fabry-Perot (F-P) Laser Transmitters, distributed feedback lasers (DFBs), or Vertical Cavity Surface Emitting Lasers (VCSELs). However, other types of optical transmitters are possible and are not beyond the scope of the present invention. With the aforementioned optical transmitters 325, the data service hub 110 lends itself to efficient upgrading by using off-the-shelf hardware to generate optical signals.

The optical signals generated by the optical transmitter 325 are propagated to amplifier 330 such as an Erbium Doped Fiber Amplifier (EDFA) where the optical signals are amplified. The amplified optical signals are then propagated out of the data service hub 110 via a bi-directional video signal input/output port 335 which is connected to one or more first optical waveguides 160.

The bi-directional video signal input/output port 335 is connected to one or more first optical waveguides 160 that support bi-directional optical signals originating from the data service hub 110 and video services terminals 117.

The data-to-RF converter 307 that transforms RF packets back into their original RF analog electrical format. Further details of RF converter 307 will be discussed below with respect to FIGS. 9-10 and 17-18. The RF analog electrical signals generated by the data-to-RF converter 307 are demodulated by an RF receiver 309. The demodulated signals are then propagated to the video services controller 115.

The data service hub 110 illustrated in FIG. 3 can further comprise an Internet router 340. According to one and preferred exemplary embodiment, the internet router 340 can separate RF return packets from other data packets and send them to the data to RF converter 307. The data service hub 110 can further comprise a telephone switch 345 that supports telephony service to the subscribers of the optical network system 100. However, other telephony service such as Internet Protocol telephony can be supported by the data service hub 110. If only Internet Protocol telephony is supported by the data service hub 110, then it is apparent to those skilled in the art that the telephone switch 345 could be eliminated in favor of lower cost VoIP equipment. For example, in another exemplary embodiment (not shown), the telephone switch 345 could be substituted with other telephone interface devices such as a soft switch and gateway. But if the telephone switch 345 is needed, it may be located remotely from the data service hub 110 and can be connected through any of several conventional methods of interconnection.

The data service hub 110 can further comprise a logic interface 350 that is connected to a laser transceiver node routing device 355. The logic interface 350 can comprise a Voice over Internet Protocol (VoIP) gateway when required to support such a service. The laser transceiver node routing device 355 can comprise a conventional router that supports an interface protocol for communicating with one or more laser transceiver nodes 120. This interface protocol can comprise one of gigabit or faster Ethernet, Internet Protocol (IP) or SONET protocols. However, the present invention is not limited to these protocols. Other protocols can be used without departing from the scope and spirit of the present invention.

The logic interface 350 and laser transceiver node routing device 355 can read packet headers originating from the laser transceiver nodes 120 and the internet router 340. The logic interface 350 can also translate interfaces with the telephone switch 345. After reading the packet headers, the logic interface 350 and laser transceiver node routing device 355 can determine where to send the packets of information.

Specifically, instead of using the internet router 340 to identify RF packets and according to an alternate exemplary embodiment, the laser transceiver node routing device 355 can identify RF packets and separate them from other data packets. The laser transceiver node routing device 355 could then forward RF packets to the data to RF converter 307. The connection between the laser transceiver node routing device 355 and the data to RF converter 307 has been illustrated with dashed lines to indicate that this connection is made as an alternative to the connection between the internet router 340 and the data to RF converter 307.

The laser transceiver node routing device 355 can also supply downstream data signals to respective optical transmitters 325. The data signals converted by the optical transmitters 325 can then be propagated to a bi-directional splitter 360. The optical signals sent from the optical transmitter 325 into the bi-directional splitter 360 can then be propagated towards a bi-directional data input/output port 365 that is connected to a second optical waveguide 170 that supports bi-directional optical data signals between the data service hub 110 and a respective laser transceiver node 120.

Upstream optical signals received from a respective laser transceiver node 120 can be fed into the bi-directional data input/output port 365 where the optical signals are then forwarded to the bi-directional splitter 360. From the bi-directional splitter 360, respective optical receivers 370 can convert the upstream optical signals into the electrical domain. The upstream electrical signals generated by respective optical receivers 370 are then fed into the laser transceiver node routing device 355. As noted above, each optical receiver 370 can comprise one or more photoreceptors or photodiodes that convert optical signals into electrical signals.

When distances between the data service hub 110 and respective laser transceiver nodes 120 are modest, the optical transmitters 325 can propagate optical signals at 1310 nm. But where distances between the data service hub 110 and the laser transceiver node are more extreme, the optical transmitters 325 can propagate the optical signals at wavelengths of 1550 nm with or without appropriate amplification devices.

Those skilled in the art will appreciate that the selection of optical transmitters 325 for each circuit may be optimized for the optical path lengths needed between the data service hub 110 and the outdoor laser transceiver node 120. Further, those skilled in the art will appreciate that the wavelengths discussed are practical but are only illustrative in nature. In some scenarios, it may be possible to use communication windows at 1310 and 1550 nm in different ways without departing from the scope and spirit of the present invention. Further, the present invention is not limited to a 1310 and 1550 nm wavelength regions. Those skilled in the art will appreciate that smaller or larger wavelengths for the optical signals are not beyond the scope and spirit of the present invention.

Figure 4:
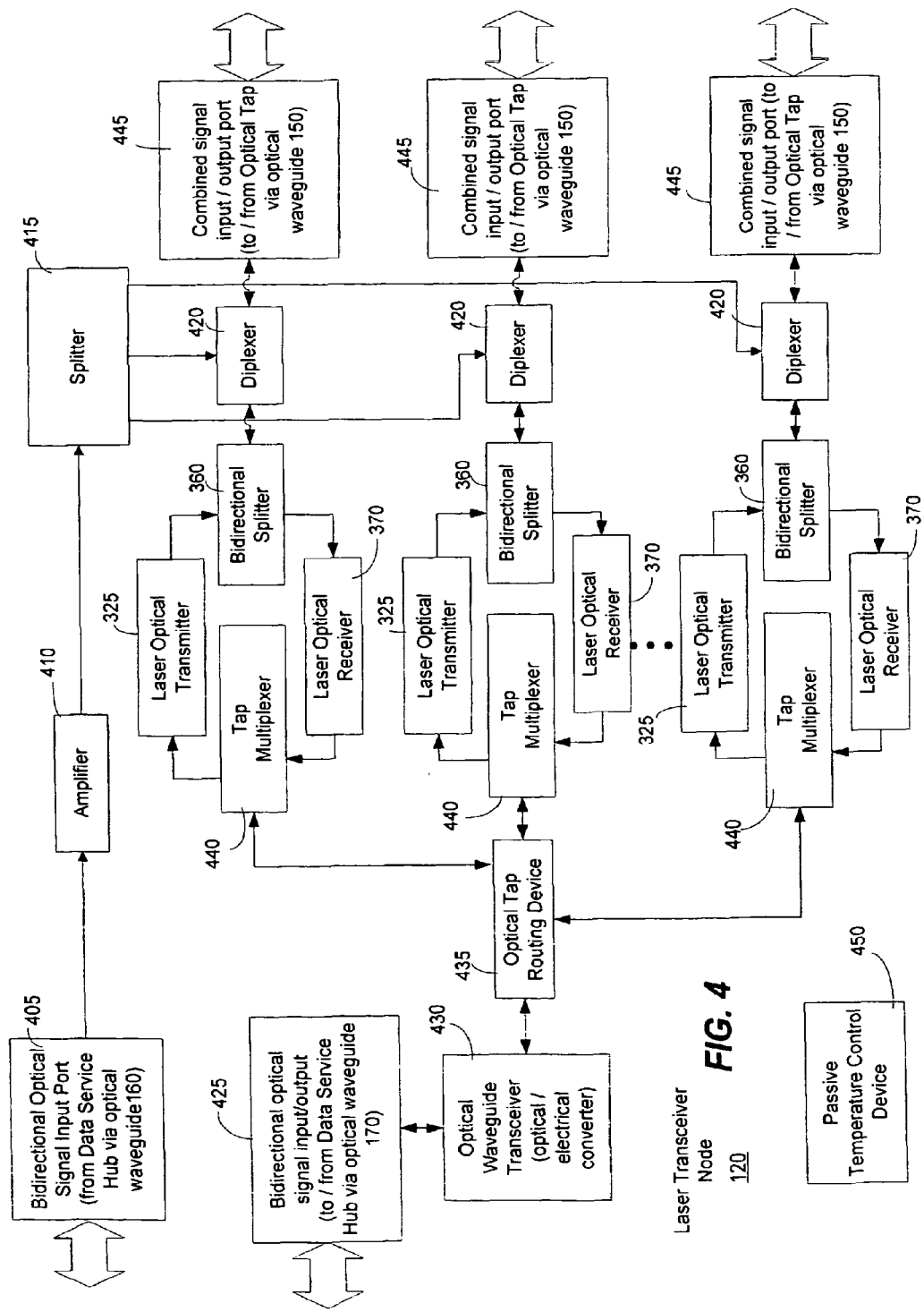
FIG. 4 is a functional block diagram illustrating an exemplary transceiver node according to an exemplary embodiment of the present invention.

Referring now to FIG. 4, this Figure illustrates a functional block diagram of an exemplary outdoor laser transceiver node 120A of the present invention. In this exemplary embodiment, the laser transceiver node 120A can comprise a bi-directional optical signal input port 405 that can receive optical signals propagated from the data service hub 110 that are propagated along a first optical waveguide 160. The optical signals received at the bi-directional optical signal input port 405 can comprise downstream broadcast video data and downstream video service control signals.

The downstream optical signals received at the input port 405 are propagated through a an amplifier 410 such as an Erbium Doped Fiber Amplifier (EDFA) in which the optical signals are amplified. The amplified optical signals are then propagated to an optical splitter 415 that divides the downstream broadcast video optical signals and video service control signals among diplexers 420 that are designed to forward optical signals to predetermined subscriber groups 200.

The laser transceiver node 120 can further comprise a bi-directional optical signal input/output port 425 that connects the laser transceiver node 120 to a second optical waveguide 170 that supports bi-directional data flow between the data service hub 110 and laser transceiver node 120. Downstream optical signals flow through the bi-directional optical signal input/output port 425 to an optical waveguide transceiver 430 that converts downstream optical signals into the electrical domain. The optical waveguide transceiver further converts upstream electrical signals into the optical domain. The optical waveguide transceiver 430 can comprise an optical/electrical converter and an electrical/optical converter.

Downstream and upstream electrical signals are communicated between the optical waveguide transceiver 430 and an optical tap routing device 435. The optical tap routing device 435 can manage the interface with the data service hub optical signals and can route or divide or apportion the data service hub signals according to individual tap multiplexers 440 that communicate optical signals with one or more optical taps 130 and ultimately one or more subscriber optical interfaces 140. It is noted that tap multiplexers 440 operate in the electrical domain to modulate laser transmitters in order to generate optical signals that are assigned to groups of subscribers coupled to one or more optical taps.

Optical tap routing device 435 is notified of available upstream data packets and upstream RF packets as they arrive, by each tap multiplexer 440. The optical tap routing device is connected to each tap multiplexer 440 to receive these upstream data and RF packets. The optical tap routing device 435 relays the RF packets and information packets that can comprise data and/or telephony packets to the data service hub 110 via the optical waveguide transceiver 430 and bidirectional optical signal input/output 425. The optical tap routing device 435 can build a lookup table from these upstream data packets coming to it from all tap multiplexers 440 (or ports), by reading the source IP address of each packet, and associating it with the tap multiplexer 440 through which it came.

The aforementioned lookup table can be used to route packets in the downstream path. As each downstream data packet comes in from the optical waveguide transceiver 430, the optical tap routing device looks at the destination IP address (which is the same as the source IP address for the upstream packets). From the lookup table the optical tap routing device 435 can determine which port (or, tap multiplexer 440) is connected to that IP address, so it sends the packet to that port. This can be described as a normal layer 3 router function as is understood by those skilled in the art.

The optical tap routing device 435 can assign multiple subscribers to a single port. More specifically, the optical tap routing device 435 can service groups of subscribers with corresponding respective, single ports. The optical taps 130 coupled to respective tap multiplexers 440 can supply downstream optical signals to pre-assigned groups of subscribers who receive the downstream optical signals with the subscriber optical interfaces 140.

In other words, the optical tap routing device 435 can determine which tap multiplexers 440 is to receive a downstream electrical signal, or identify which tap multiplexer 440 propagated an upstream optical signal (that is received as an electrical signal). The optical tap routing device 435 can format data and implement the protocol required to send and receive data from each individual subscriber connected to a respective optical tap 130. The optical tap routing device 435 can comprise a computer or a hardwired apparatus that executes a program defining a protocol for communications with groups of subscribers assigned to individual ports. Exemplary embodiments of programs defining the protocol is discussed in the following copending and commonly assigned non-provisional patent applications, the entire contents of which are hereby incorporated by reference: "Method and System for Processing Downstream Packets of an Optical Network," filed on Oct. 26, 2001 in the name of Stephen A. Thomas et al. and assigned U.S. Ser. No. 10/045,652; and "Method and System for Processing Upstream Packets of an Optical Network," filed on Oct. 26, 2001 in the name of Stephen A. Thomas et al. and assigned U.S. Ser. No. 10/045, 584.

The single ports of the optical tap routing device are connected to respective tap multiplexers 440. With the optical tap routing device 435, the laser transceiver node 120 can adjust a subscriber's bandwidth on a subscription basis or on an as-needed or demand basis. The laser transceiver node 120 via the optical tap routing device 435 can offer data bandwidth to subscribers in pre-assigned increments. For example, the laser transceiver node 120 via the optical tap routing device 435 can offer a particular subscriber or groups of subscribers bandwidth in units of 1, 2, 5, 10, 20, 50, 100, 200, and 450 Megabits per second (Mb/s). Those skilled in the art will appreciate that other subscriber bandwidth units are not beyond the scope of the present invention.

Electrical signals are communicated between the optical tap routing device 435 and respective tap multiplexers 440. The tap multiplexers 440 propagate optical signals to and from various groupings of subscribers by way of laser optical transmitter 525 and laser optical receiver 370. Each tap multiplexer 440 is connected to a respective optical transmitter 325. As noted above, each optical transmitter 325 can comprise one of a Fabry-Perot (F-P) laser, a distributed feedback laser (DFB), or a Vertical Cavity Surface Emitting Laser (VCSEL). The optical transmitters produce the downstream optical signals that are propagated towards the subscriber optical interfaces 140. Each tap multiplexer 440 is also coupled to an optical receiver 370. Each optical receiver 370, as noted above, can comprise photoreceptors or photodiodes. Since the optical transmitters 325 and optical receivers 370 can comprise off-the-shelf hardware to generate and receive respective optical signals, the laser transceiver node 120 lends itself to efficient upgrading and maintenance to provide significantly increased data rates.

Each optical transmitter 325 and each optical receiver 370 are connected to a respective bi-directional splitter 360. Each bi-directional splitter 360 in turn is connected to a diplexer 420 which combines the unidirectional optical signals received from the splitter 415 with the downstream optical signals received from respective optical receivers 370. In this way, broadcast video services as well as data services can be supplied with a single optical waveguide such as a distribution optical waveguide 150 as illustrated in FIG. 2. In other words, optical signals can be coupled from each respective diplexer 420 to a combined signal input/output port 445 that is connected to a respective distribution optical waveguide 150.

Unlike the conventional art, the laser transceiver node 120 does not employ a conventional router. The components of the laser transceiver node 120 can be disposed within a compact electronic packaging volume. For example, the laser transceiver node 120 can be designed to hang on a strand or fit in a pedestal similar to conventional cable TV equipment that is placed within the "last," mile or subscriber proximate portions of a network. It is noted that the term, "last mile," is a generic term often used to describe the last portion of an optical network that connects to subscribers.

Also because the optical tap routing device 435 is not a conventional router, it does not require active temperature controlling devices to maintain the operating environment at a specific temperature. Optical tap routing device 435 does not need active temperature controlling devices because it can be designed with all temperature-rated components. In other words, the laser transceiver node 120 can operate in a temperature range between minus 40 degrees Celsius to 60 degrees Celsius in one exemplary embodiment.

While the laser transceiver node 120 does not comprise active temperature controlling devices that consume power to maintain temperature of the laser transceiver node 120 at a single temperature, the laser transceiver node 120 can comprise one or more passive temperature controlling devices 450 that do not consume power. The passive temperature controlling devices 450 can comprise one or more heat sinks or heat pipes that remove heat from the laser transceiver node 120. Those skilled in the art will appreciate that the present invention is not limited to these exemplary passive temperature controlling devices. Further, those skilled in the art will also appreciate the present invention is not limited to the exemplary operating temperature range disclosed. With appropriate passive temperature controlling devices 450, the operating temperature range of the laser transceiver node 120 can be reduced or expanded.

In addition to the laser transceiver node's 120 ability to withstand harsh outdoor environmental conditions, the laser transceiver node 120 can also provide high speed symmetrical data transmissions. In other words, the laser transceiver node 120 can propagate the same bit rates downstream and upstream to and from a network subscriber. This is yet another advantage over conventional networks, which typically cannot support symmetrical data transmissions as discussed in the background section above. Further, the laser transceiver node 120 can also serve a large number of subscribers while reducing the number of connections at both the data service hub 110 and the laser transceiver node 120 itself.

The laser transceiver node 120 also lends itself to efficient upgrading that can be performed entirely on the network side or data service hub 110 side. That is, upgrades to the hardware forming the laser transceiver node 120 can take place in locations between and within the data service hub 110 and the laser transceiver node 120. This means that the subscriber side of the network (from distribution optical waveguides 150 to the subscriber optical interfaces 140) can be left entirely in-tact during an upgrade to the laser transceiver node 120 or data service hub 110 or both.

The following is provided as an example of an upgrade that can be employed utilizing the principles of the present invention. In one exemplary embodiment of the invention, the subscriber side of the laser transceiver node 120 can service six groups of 16 subscribers each for a total of up to 96 subscribers. Each group of 16 subscribers can share a data path of about 450 Mb/s speed. Six of these paths represents a total speed of 6×450=2.7 Gb/s. In the most basic form, the data communications path between the laser transceiver node 120 and the data service hub 110 can operate at 1 Gb/s. Thus, while the data path to subscribers can support up to 2.7 Gb/s, the data path to the network can only support 1 Gb/s. This means that not all of the subscriber bandwidth is useable. This is not normally a problem due to the statistical nature of bandwidth usage.

An upgrade could be to increase the 1 Gb/s data path speed between the laser transceiver node 120 and the data service hub 110. This may be done by adding more 1 Gb/s data paths. Adding one more path would increase the data rate to 2 Gb/s, approaching the total subscriber-side data rate. A third data path would allow the network-side data rate to exceed the subscriber-side data rate. In other exemplary embodiments, the data rate on one link could rise from 1 Gb/s to 2 Gb/s then to 10 Gb/s, so when this happens, a link can be upgraded without adding more optical links.

The additional data paths (bandwidth) may be achieved by any of the methods known to those skilled in the art. It may be accomplished by using a plurality of optical waveguide transceivers 430 operating over a plurality of optical waveguides, or they can operate over one optical waveguide at a plurality of wavelengths, or it may be that higher speed optical waveguide transceivers 430 could be used as shown above. Thus, by upgrading the laser transceiver node 120 and the data service hub 110 to operate with more than a single 1 Gb/s link, a system upgrade is effected without having to make changes at the subscribers' premises.

Figure 5:
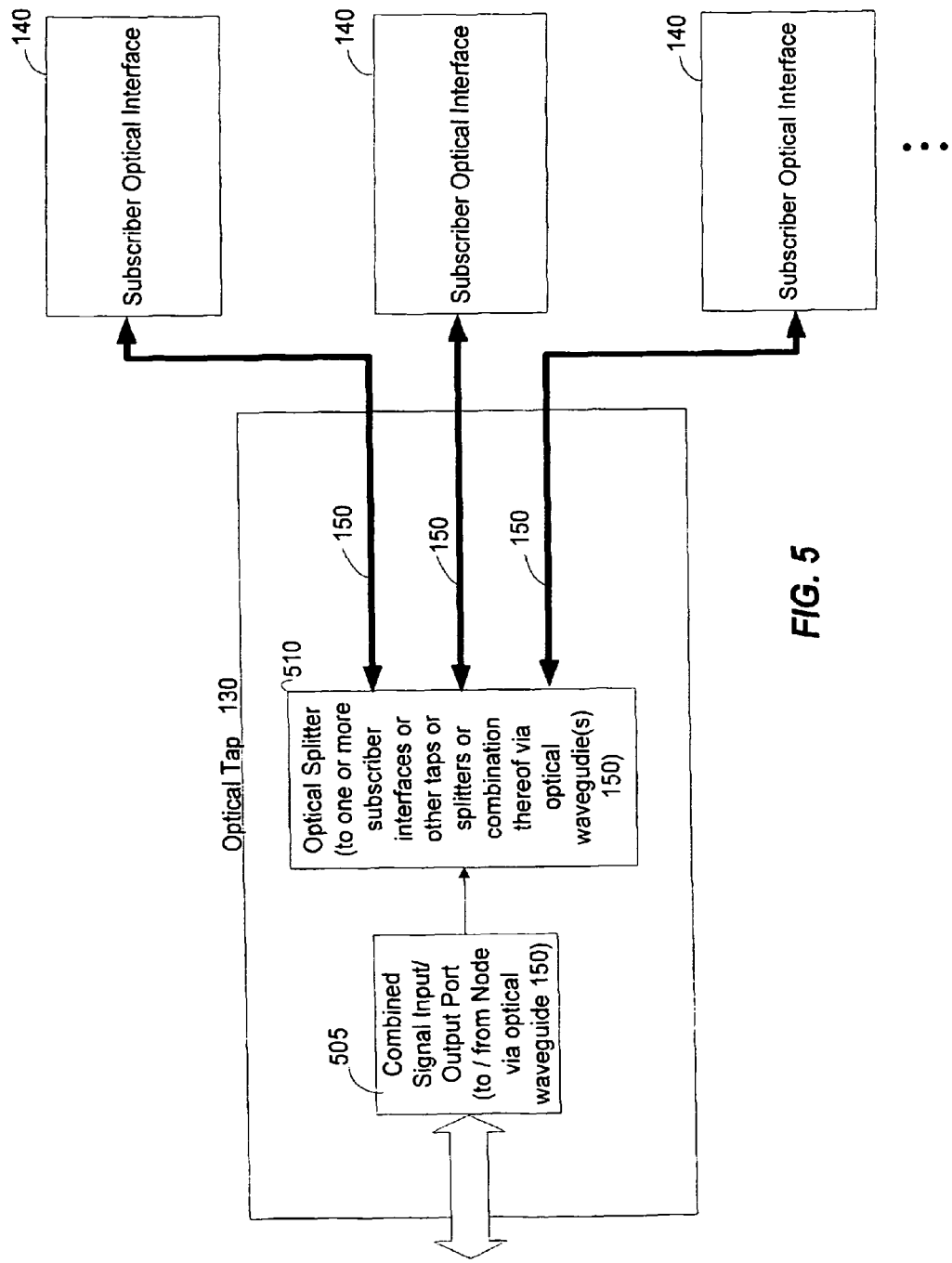
FIG. 5 is a functional block diagram illustrating an optical tap coupled to a plurality of subscriber optical interfaces according to an exemplary embodiment of the present invention.

Referring now to FIG. 5, this Figure is a functional block diagram illustrating an optical tap 130 connected to a plurality of subscriber optical interfaces 140 by optical waveguides 150 according to one exemplary embodiment of the present invention. The optical tap 130 can comprise a combined signal input/output port 505 that is connected to another distribution optical waveguide 150 that is connected to a laser transceiver node 120. As noted above, the optical taps 130 can comprise an optical splitter 510 that can be a 4-way or 8-way optical splitter. Other optical taps having fewer or more than 4-way or 8-way splits are not beyond the scope of the present invention.

The optical tap 130 can divide downstream optical signals to serve respective subscriber optical interfaces 140. In the exemplary embodiment in which the optical tap 130 comprises a 4-way optical tap, such an optical tap can be of the pass-through type, meaning that a portion of the downstream optical signals is extracted or divided to serve a 4-way splitter contained therein, while the rest of the optical energy is passed further downstream to other distribution optical waveguides 150.

The optical tap 130 is an efficient coupler that can communicate optical signals between the laser transceiver node 120 and a respective subscriber optical interface 140. Optical taps 130 can be cascaded, or they can be connected in a star architecture from the laser transceiver node 120. As discussed above, the optical tap 130 can also route signals to other optical taps that are downstream relative to a respective optical tap 130.

The optical tap 130 can also connect to a limited or small number of distribution optical waveguides 150 so that high concentrations of optical waveguides are not present at any particular laser transceiver node 120. In other words, in one exemplary embodiment, the optical tap can connect to a limited number of optical waveguides 150 at a point remote from the laser transceiver node 120 so that high concentrations of optical waveguides 150 at a laser transceiver node can be avoided. However, those skilled in the art will appreciate that the optical tap 130 can be incorporated within the laser transceiver node 120 with respect to another exemplary embodiment (not shown).

The subscriber optical interface 140 functions to convert downstream optical signals received from the optical tap 130 into the electrical domain that can be processed with appropriate communication devices. The subscriber optical interface 140 further functions to convert upstream data and RF packet electrical signals into upstream optical signals that can be propagated along a distribution optical waveguide 150 to the optical tap 130.

Figure 6:
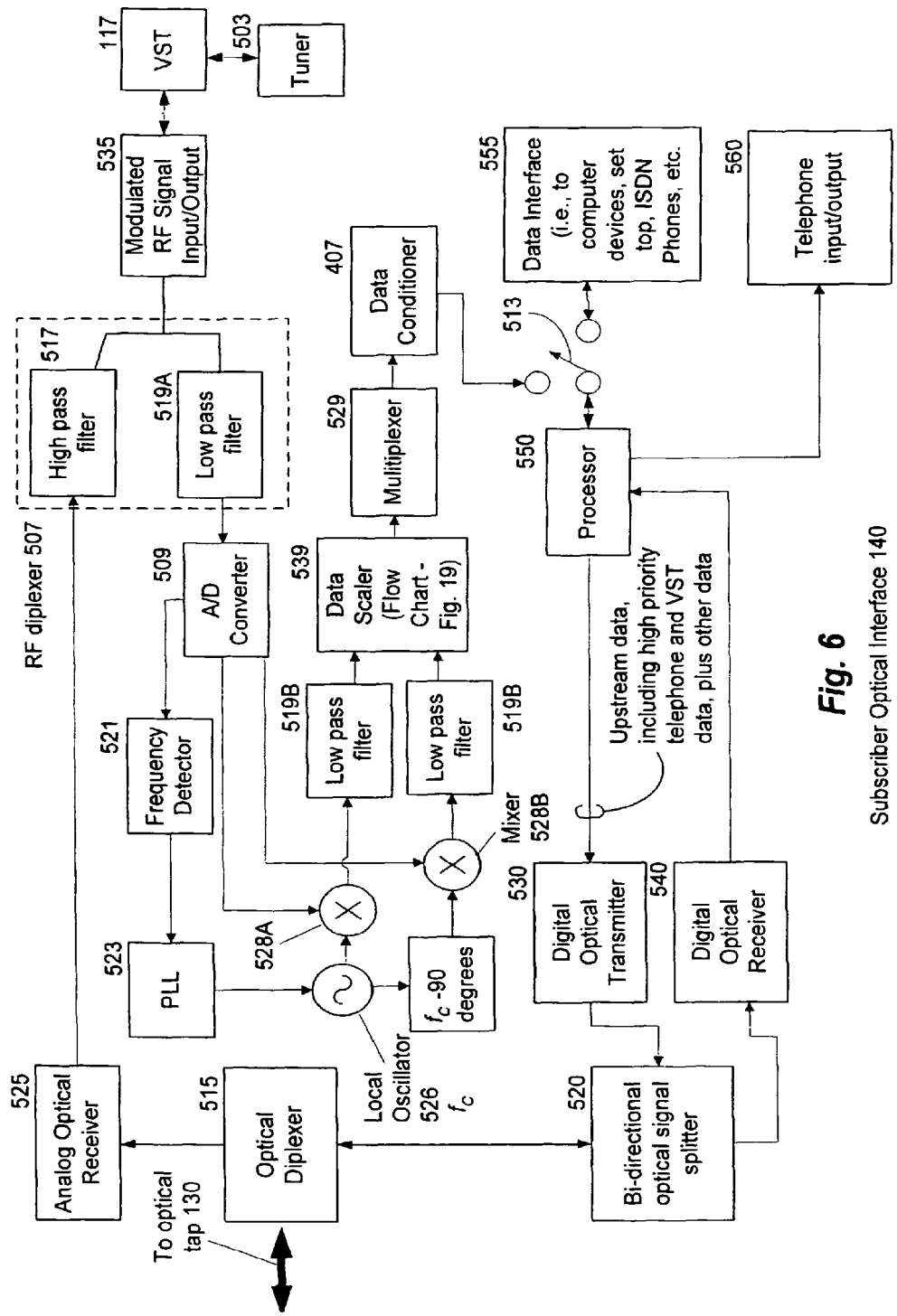
FIG. 6 is a functional block diagram illustrating a subscriber optical interface of one preferred exemplary embodiment that divides upstream RF signals into two data streams.

Referring now to FIG. 6, one exemplary embodiment of a first subscriber optical interface 140A is illustrated. The subscriber optical interface 140A can comprise an optical diplexer 515 that divides the downstream optical signals received from the distribution optical waveguide 150 between a bi-directional optical signal splitter 520 and an analog optical receiver 525. The optical diplexer 515 can receive upstream optical signals generated by a digital optical transmitter 530. The digital optical transmitter 530 converts electrical binary/digital signals such as upstream data packets and RF packets to optical form so that the optical signals can be transmitted back to the data service hub 110. Conversely, the digital optical receiver 540 converts optical signals into electrical binary/digital signals so that the electrical data signals can be handled by processor 550. Processor 550 can comprise an application specific integrated circuit (ASIC) in combination with a central processing unit (CPU). However, other hardware or software implementations or combinations thereof are not beyond the scope and spirit of the present invention.

The RF return system of the present invention can propagate the optical signals at various wavelengths. However, the wavelength regions discussed are practical and are only illustrative of exemplary embodiments. Those skilled in the art will appreciate that other wavelengths that are either higher or lower than or between the 1310 and 1550 nm wavelength regions are not beyond the scope of the present invention.

The analog optical receiver 525 can convert the downstream broadcast optical video signals into modulated RF television signals and downstream video service control signals into analog RF signals that are propagated through an RF diplexer 507 and out of the modulated RF signal input/output 535. The modulated RF bidirectional signal input/output 535 can feed into the video services terminal 117. The video services terminal 117 can be coupled to a tuner 503 that comprises a television set or radio. The analog optical receiver 525 can process analog modulated RF transmission as well as digitally modulated RF transmissions for digital TV applications.

The bi-directional optical signal splitter 520 can propagate combined optical signals in their respective directions. That is, downstream optical signals entering the bi-directional optical splitter 520 from the optical the optical diplexer 515, are propagated to the digital optical receiver 540. Upstream optical signals entering it from the digital optical transmitter 530 are sent to optical diplexer 515 and then to optical tap 130. The bi-directional optical signal splitter 520 is connected to a digital optical receiver 540 that converts downstream data optical signals into the electrical domain. Meanwhile the bi-directional optical signal splitter 520 is also connected to a digital optical transmitter 530 that converts upstream data packet and RF packet electrical signals into the optical domain.

The digital optical receiver 540 can comprise one or more photoreceptors or photodiodes that convert optical signals into the electrical domain. The digital optical transmitter 530 can comprise one or more lasers such as the Fabry-Perot (F-P) Lasers, distributed feedback lasers, and Vertical Cavity Surface Emitting Lasers (VCSELs). Other types of lasers are within the scope and spirit of the invention.

The digital optical receiver 540 and digital optical transmitter 530 are connected to a processor 550 that selects data intended for the instant subscriber optical interface 140 based upon an embedded address. The data handled by the processor 550 can comprise one or more of telephony and data services such as an Internet service. The processor 550 is connected to a telephone input/output 560 that can comprise an analog interface. The processor 550 is also connected to a data interface 555 that can provide a link to computer devices, ISDN phones, and other like devices. Alternatively, the data interface 555 can comprise an interface to a Voice over Internet Protocol (VoIP) telephone or Ethernet telephone. The data interface 555 can comprise one of Ethernet (10BaseT, 100BaseT, Gigabit) interface, HPNA interface, a universal serial bus (USB) an IEEE1394 interface, an ADSL interface, and other like interfaces.

The processor 550 is also designed to create the upstream RF packets that will transport the RF signals from the video services terminal 117 to the data service hub 110. Specifically, the RF signals to be returned from the video service terminal 117 in a subscriber's home are propagated towards the modulated RF input/output signal interface 535. Each RF return signal can comprise a frequency that exists between an exemplary range of 5 and 42 MHz in North America. The RF signal can comprise an occasional burst of RF modulated data, which must be transported back to the headend.

When the video services terminal 117 generates RF signals, these RF signals are propagated through the modulated RF signal input/output signal interface 535 to the diplexer 507. The diplexer 507 can comprise a high pass filter 517 and a low pass filter 519. The high pass filter supports downstream analog RF signals that can comprise video content and control signals for the video service terminal 117. The low pass filter 519 can support upstream analog RF signals generated by the video service terminal 117.

The diplexer 507 passes the upstream analog RF signals to an analog-to-digital (A/D) converter 509. From the A/D converter 509, the digital RF signals can be split into two data streams. A first data stream can be mixed down to a zero frequency in a first mixer 528A by mixing the first data stream with a carrier frequency produced by a local oscillator 526. In other words, this mixing process can be driven by the local oscillator 526 which can be frequency controlled from a phase locked loop (PLL) 523. The frequency of the PLL 523 can be determined by a frequency detector 521 that measures the frequency of the RF signal at the A/D converter 509 passing out of the low pass filter. The local oscillator 526 can be set to this measured frequency. The measured frequency can be calculated by measuring the time between a plurality of zero crossings of the digitized RF signal.

A second data stream flowing out of the A/D converter 509 can be mixed in a second mixer 528B with a carrier signal that is at the same frequency as the first carrier or local oscillator signal, but phased ninety degrees apart from the first carrier signal. This phase shift of the first carrier signal can be made with a phase shifter 527. The first and second data streams flowing through the first and second mixers 528A, 528B can be propagated through low pass filters 519A, 519B. The two data streams can then be scaled down with a data scaler 539 in order to reduce the amount of digitized RF data transmitted.

While in the data reducer 539, certain algorithms are applied to reduce the amount of data transmitted. A number of algorithms related to subsampling and other techniques are known to those skilled in the art. Further details of the data scaler 539 will be discussed below with respect to FIG. 15.

The reduced data streams comprising digitized RF signals are then propagated to a multiplexer 529 where the two data streams are combined and then propagated to a data conditioner 407. The data conditioner 407 at this stage can speed up data transmission of the RF signals. The data conditioner 407 can comprise a buffer such as a FIFO that also inputs identification information with the digitized RF signals to form RF packets. That is, an RF packet can comprise digitized and reduced RF signals that are coupled with identification information.

As noted above, the RF packets can be formatted as Ethernet packets. However, other packet formats are not beyond the scope and spirit of the present invention. Reduced RF signals may enter the data conditioner 407 at an exemplary transmission speed of 40 Megabits per second (Mps) while the newly formed RF packets exit the data conditioner 407 at an exemplary transmission speed of 500 Megabits per second (Mps). However, other transmission speeds are not beyond the scope of the present invention.

RF packets are transferred upstream from the data conditioner 407 when a switch 513 connects the data conditioner 407 to the digital optical transmitter 530. The switch 513 is controlled by processor 550. When switch 513 is not connected to the data conditioner 407, it can connect the output of the processor 550 to the digital optical transmitter 530. In other words, the switch 513 may be activated at appropriate times to combine the upstream RF packets from the data conditioner 407 with upstream data packets from the processor 550 destined for the data service hub 110. More specifically, the RF packets may be inserted between upstream packets comprising data generated by a subscriber with a communication device such as a computer or telephone. The present invention is not limited to a discrete switch 513 as described above. The switch functionality may be incorporated into the processor 550 or other appropriate hardware device in the subscriber optical interface 140A.

Figure 7:
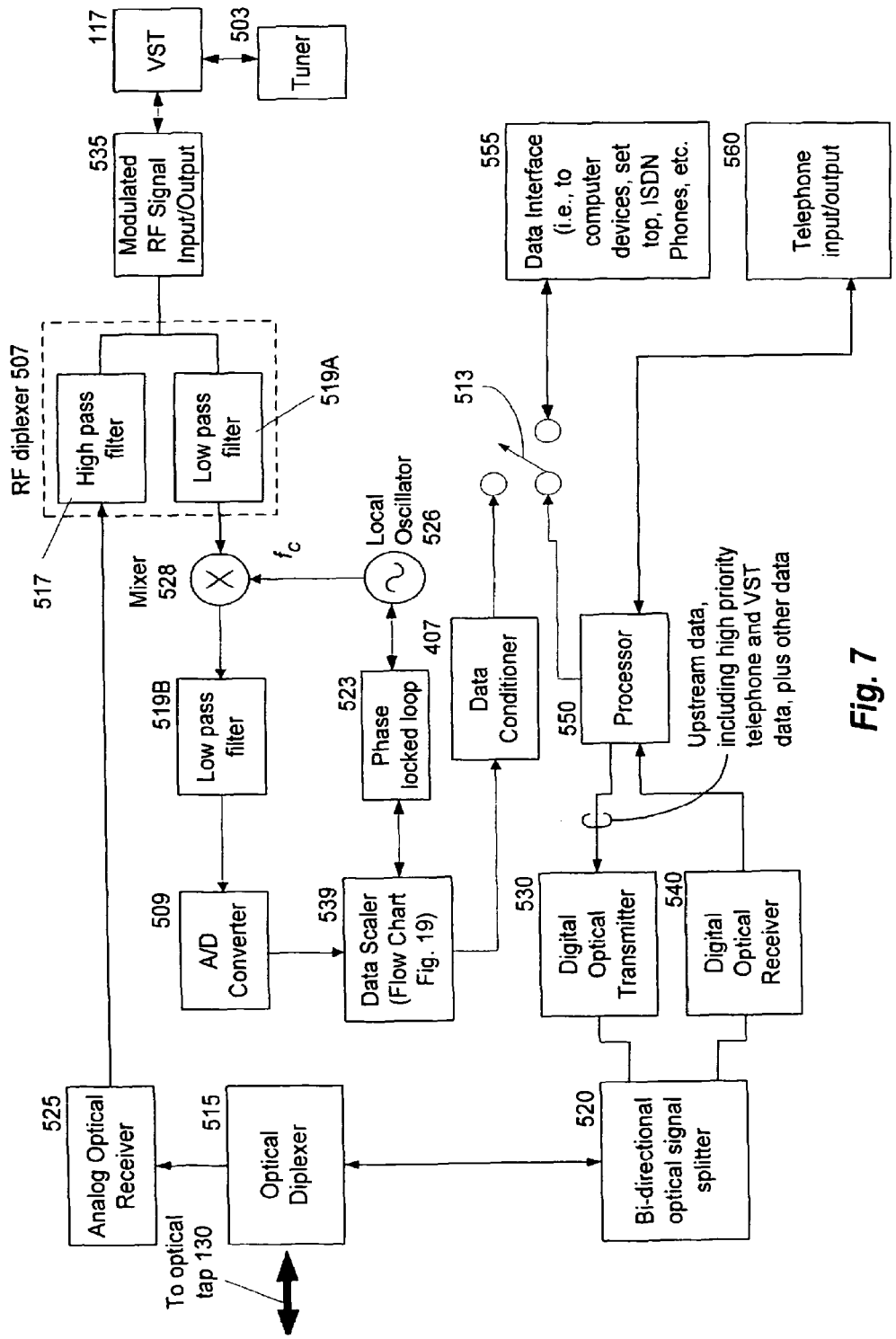
FIG. 7 is a functional block diagram illustrating a subscriber optical interface of an alternate embodiment that employs a single data stream and a phase locked loop.

Referring now to FIG. 7, this Figure is a functional block diagram illustrating a second subscriber optical interface 140B of an alternate embodiment that employs a single data stream and a phase locked loop 523. Because of the similarities between FIGS. 6 and 7, only the differences between these two figures will be described.

A control word is loaded into the phase lock loop 523 to establish a frequency of the oscillator 526. In this embodiment, the local oscillator frequency can be determined by measuring the frequency of the incoming RF signal flowing out of a first low pass filter 519A. The measured frequency can be calculated by measuring the time between a plurality of zero crossings of the RF signal. Once the measured frequency is determined, then an offset frequency can be added to the measured frequency such that the RF signal has side bands that extend near, but do not cross, a zero frequency value.

The analog signal from the local oscillator 526 is mixed with the analog RF return signal generated by the video services terminal 117 in the mixer 528 to produce a difference frequency. The difference frequency is filtered with a second low pass filter 519B and is fed into an A/D converter 509. The difference frequency is converted to the digital domain with the A/D converter 509. The digital signals are then scaled down with the data scaler 539 to reduce the amount of RF data transmitted. The reduced digital signals are fed into the data conditioner 407.

The data conditioner 407 at this stage, similar to the first exemplary subscriber optical interface 140A discussed above, can speed up data transmission of the digitized RF signals. The data conditioner 407 can comprise a buffer such as a FIFO that also inputs identification information with the digitized RF signals to form RF packets. Reduced RF signals may enter the data conditioner 407 at an exemplary transmission speed of 40 Megabits per second (Mps) while the newly formed RF packets exit the data conditioner 407 at an exemplary transmission speed of 500 Megabits per second (Mps). However, other transmission speeds are not beyond the scope of the present invention. RF packets are transferred upstream from the data conditioner 407 when a switch 513 connects the data conditioner 407 to the digital optical transmitter 530, as discussed above similar to the first exemplary subscriber optical interface 140A.

Referring now to FIG. 8, this Figure is a graph 800 illustrating a frequency plan for the subscriber optical interface 140B of FIG. 7 according to one exemplary embodiment of the present invention. The upstream RF signal from the video services terminal 117 is extracted in the first low pass filter 519A and supplied to the mixer 528. At the mixer 528, the upstream RF signal is mixed with a carrier frequency ($f_C$) generated by the local oscillator 526. The mixer 528 produces sum and difference frequencies from these two input signals as is well understood by those skilled in the art. The difference frequency 805 is the signal that will be digitized by the A/D converter 509. The sum or image frequency 810 is not used and is eliminated by the second low pass filter 519B. The second low pass filter 519B can also eliminate any other frequency component other than the difference frequency 805 that is generated by the mixer 528. For example, the second low pass filter 519B can eliminate the base RF signal produced by the video services terminal 117 and the carrier frequency ($f_C$) generated by the local oscillator 526. From the second low pass filter 519B, the difference frequency 805 is fed into the A/D converter as discussed above with respect to FIG. 7.

Referring now to FIG. 9, this Figure is a functional block diagram illustrating some components of a data-to-RF conversion block 307A according to one preferred and exemplary embodiment of the present invention. This data-to-RF conversion block 307A is typically used in the data service hub 110 when the first subscriber optical interface 140A discussed above is used by the subscribers.

In this exemplary embodiment, the upstream RF packets are identified by either an internet router 340 or the laser transceiver routing device 355, depending on how the data service hub 110 is configured. The RF data received from the router 340 or routing device 355 is restored with a scaling restoration unit 317. Further details of the scaling restoration unit will be discussed below with respect to FIG. 19.

The restored RF packets are split into first and second data streams after the scaling restoration unit. At a first mixer 528A, the first data stream is mixed with the carrier frequency produced by the local oscillator 526. At a second mixer 528B, the second data stream is mixed with a carrier signal produced by a phase shifter 527 that is ninety degrees apart from a carrier frequency produced by a local oscillator 526.

The first data stream and second data stream are then added together at an adder 905. The combined data stream is then converted back to the original RF analog signal with a digital-to-analog (D/A) converter 910. The restored analog RF signal is then filtered with a bandpass filter 915 and is then fed to RF receivers 309 connected to the video service controllers 115.

Referring now to FIG. 10A, this figure is a functional block diagram illustrating some components of a second data-to-RF conversion block 307B according to an alternate exemplary embodiment of the present invention. This second data-to-RF conversion block 307B is typically used in the data service hub 110 when the second subscriber optical interface 140B discussed above is used by the subscribers.

In this exemplary embodiment, the upstream RF packets are identified by either an internet router 340 or the laser transceiver routing device, depending on how the data service hub 110 is configured. The upstream RF packets are then used to reconstruct the original and fuller digital signal with the scaling restoration unit 317. Further details for the scaling restoration unit will be discussed below with respect to FIG. 19.

During restoration, a control word for a phase locked loop 523 is determined. The control word for the PLL 523 is determined by measuring the frequency of the incoming RF carrier frequency. This frequency may be measured using any of several techniques known to those skilled in the art. In one preferred and exemplary embodiment, the frequency is measured by counting the number of times the incoming RF carrier crosses 0 volts during a predefined time interval. During this time interval the subscriber video service terminal is transmitting a known synchronization word.

The control word is then loaded into the phase locked loop 523 to set the frequency of a local oscillator 528. Meanwhile, the restored digital RF signal is fed to a digital-to-analog converter 910 where it is converted back into an analog RF signals.

The analog RF signal is filtered with a low pass filter 519. The filtered analog RF signal is then mixed with the carrier frequency produced by the local oscillator 526 at a mixer 528. The combined signal is then filtered by a bandpass filter 915.

Referring now to FIG. 10B, this figure is a graph 1000 illustrating a frequency plan for a data service hub 110 according to one exemplary embodiment of the present invention. This frequency plan corresponds to the signals produced by the second data-to-RF converter 307B illustrated in FIG. 10A.

Graph 1000 illustrates the response 1005 of the low pass filter 519 of FIG. 10A. Graph 1000 also illustrates the signal 1010 produced by the local oscillator 526 and the image signal 1015. And lastly, Graph 1000 further illustrates the response 1020 of the bandpass filter 915.

Figure 11:
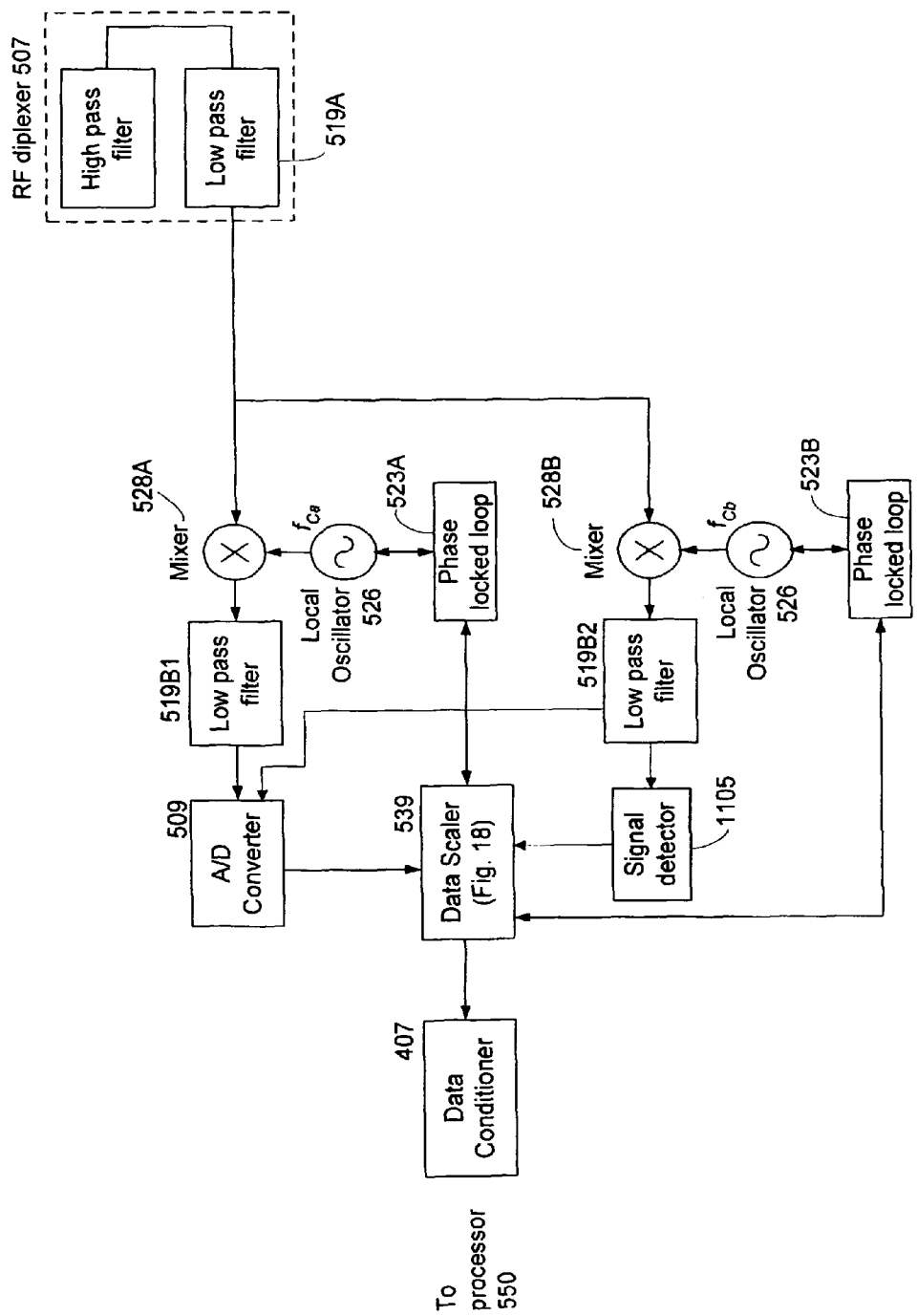
FIG. 11 is a functional block illustrating exemplary components of another subscriber optical interface according to an alternate exemplary embodiment of the present invention that can accommodate two RF return frequencies.

Referring now to FIG. 11, this Figure is a functional block illustrating exemplary components of another subscriber optical interface 140C according to an alternate exemplary embodiment of the present invention that can accommodate two RF return frequencies. In some legacy RF return systems, it is possible that two RF return frequencies will be used at different times. Because both frequencies are typically not used at the same time, sharing of hardware within a subscriber optical interface 140C can be permitted to produce the RF return packets.

Because of the similarities between FIGS. 7 and 11, only the differences between these two figures will be described. Operation of the embodiment illustrated in FIG. 11 is identical to that described above with respect to FIG. 7, however, the two outputs of the second low pass filters 519B1, 519B2 are both supplied to the A/D converter 509. A signal detector circuit 1105 is added to the second channel/frequency in order to allow determination of which channel/frequency is active.

This is necessary in order to set the local oscillator 526 of the second data-to-RF converter 307B of FIG. 10A to the correct frequency.

Figure 12:
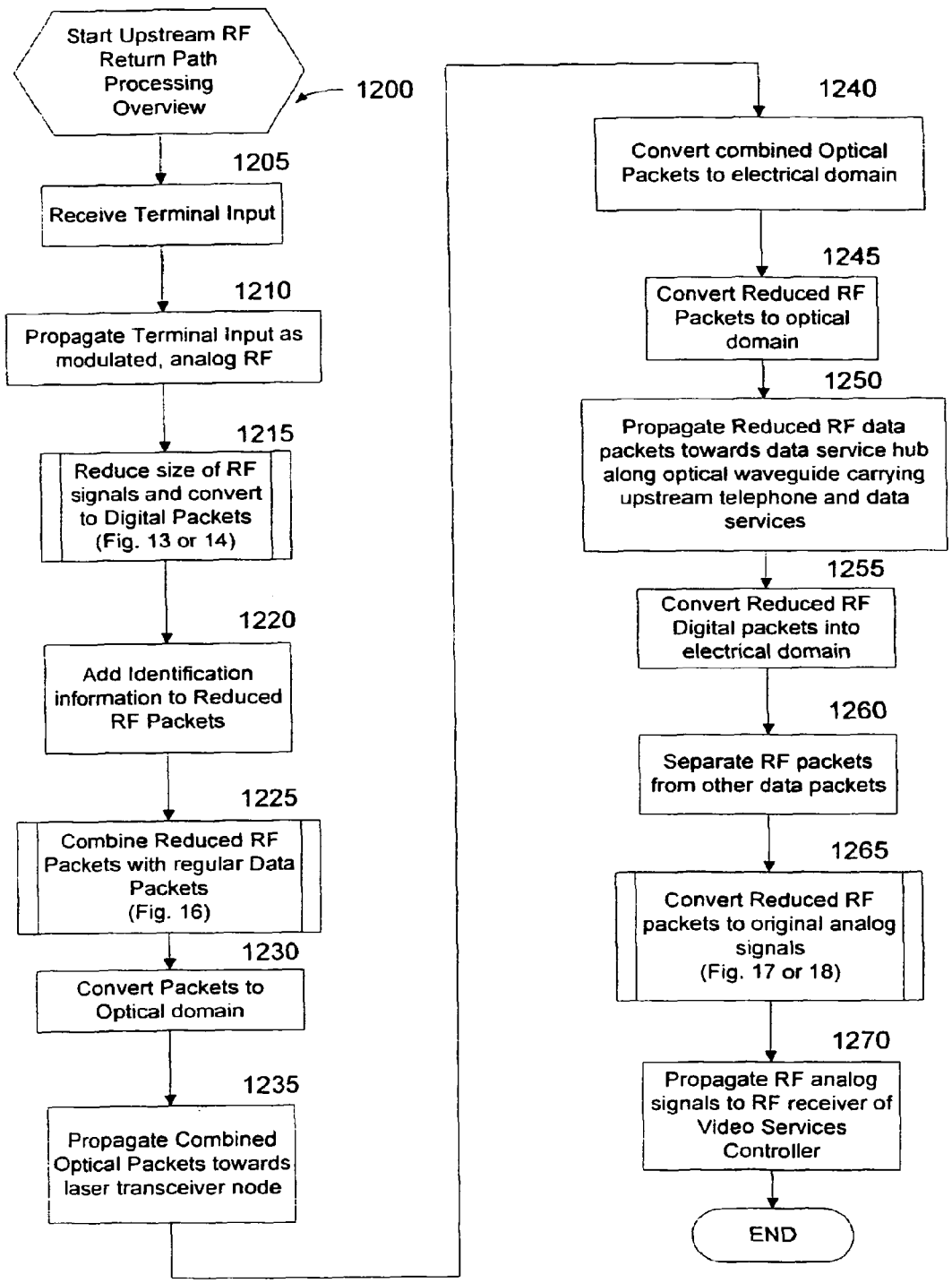
FIG. 12 is a logic flow diagram illustrating an exemplary method for propagating upstream RF signals towards a data service hub.

Referring now to FIG. 12, this Figure is a logic flow diagram illustrating an exemplary method 1200 for propagating upstream RF signals towards a data service hub 110. The description of the flow charts in the this detailed description are represented largely in terms of processes and symbolic representations of operations by conventional computer components, including a processing unit (a processor), memory storage devices, connected display devices, and input devices. Furthermore, these processes and operations may utilize conventional discrete hardware components or other computer components in a heterogeneous distributed computing environment, including remote file servers, computer servers, and memory storage devices. Each of these conventional distributed computing components can be accessible by the processor via a communication network.

The processes and operations performed below may include the manipulation of signals by a processor and the maintenance of these signals within data structures resident in one or more memory storage devices. For the purposes of this discussion, a process is generally conceived to be a sequence of computer-executed steps leading to a desired result. These steps usually require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to representations of these signals as bits, bytes, words, information, elements, symbols, characters, numbers, points, data, entries, objects, images, files, or the like. It should be kept in mind, however, that these and similar terms are associated with appropriate physical quantities for computer operations, and that these terms are merely conventional labels applied to physical quantities that exist within and during operation of the computer.

It should also be understood that manipulations within the computer are often referred to in terms such as creating, adding, calculating, comparing, moving, receiving, determining, identifying, populating, loading, executing, etc. that are often associated with manual operations performed by a human operator. The operations described herein can be machine operations performed in conjunction with various input provided by a human operator or user that interacts with the computer.

In addition, it should be understood that the programs, processes, methods, etc. described herein are not related or limited to any particular computer or apparatus. Rather, various types of general purpose machines may be used with the following process in accordance with the teachings described herein.

The present invention may comprise a computer program or hardware or a combination thereof which embodies the functions described herein and illustrated in the appended flow charts. However, it should be apparent that there could be many different ways of implementing the invention in computer programming or hardware design, and the invention should not be construed as limited to any one set of computer program instructions. Further, a skilled programmer would be able to write such a computer program or identify the appropriate hardware circuits to implement the disclosed invention without difficulty based on the flow charts and associated description in the application text, for example. Therefore, disclosure of a particular set of program code instructions or detailed hardware devices is not considered necessary for an adequate understanding of how to make and use the invention. The inventive functionality of the claimed computer implemented processes will be explained in more detail in the following description in conjunction with the remaining Figures illustrating other process flows.

Certain steps in the processes or process flow described below must naturally precede others for the present invention to function as described. However, the present invention is not limited to the order of the steps described if such order or sequence does not alter the functionality of the present invention. That is, it is recognized that some steps may be performed before, after, or in parallel other steps without departing from the scope and spirit of the present invention.

Again, referring now to FIG. 12, this Figure provides an overview of the processing performed by the subscriber optical interfaces 140, laser transceiver nodes 120, and data service hub 110. Step 1205 is the first step in the exemplary upstream overview process 1200. In step 1205, terminal input is received at a video service terminal 117. Next, in step 1210, the terminal input is propagated as modulated analog RF signals towards the subscriber optical interface 140.

In routine 1215, the analog RF signals are reduced and converted to digital packets. However, it is noted that routine 1215 does not need to take place in the subscriber optical interface 140. The reduction and analog to digital conversion process can take place at the laser transceiver node 120 or it could occur at the video service terminal 117. Further details of routine 1215 will be described below with respect to FIGS. 13 and 14.

In step 1220, identification information is added to the reduced RF packet. This identification information can comprise headers used to uniquely identify RF packets from other types of data packets. The identification information may further comprise a control word used by phase locked loops 523 during the scaling and restoration processes described below. This identification information is typically supplied by the data conditioner 407. However, the functions identified in step 1220 can be accomplished with other hardware devices other than the data conditioners 407. The present invention is not limited to the hardware devices which perform the functions described in step 1220.

In routine 1225, the reduced RF return packets are combined with regular data packets. Further details of routine 1225 will be discussed below with respect to FIG. 16.

In step 1230, the combined electrical RF return packets and data packets are converted to the optical domain at the subscriber optical interface 140. Next, in step 1235, the combined optical packets are propagated towards the laser transceiver node 120 along a waveguide 150.

In step 1240, the combined optical packets are converted to the electrical domain with a digital optical receiver such as the receiver 370 of the laser transceiver node 120 as illustrated in FIG. 4. This conversion of the optical packets to the electrical domain in the laser transceiver node 120 occurs because the laser transceiver node 120 is combining data received from multiple groups of subscribers at the optical tap routing device 435. Next, in step 1245, the reduced RF packets are converted back to the optical domain by an optical waveguide transceiver 430.

In step 1250, the reduced RF packets and the regular data packets are propagated upstream towards a data service hub 110 along the optical wave guide 170 that also carries down stream data packets that can comprise telephone and data services. In step 1255 the reduced RF digital packets and regular upstream data packets are converted back to the electrical domain with the optical receivers 370 of the data service hub 110.

In step 1260, the reduced RF packets are separated from the regular upstream data packets with either the interne router 340 or laser transceiver node routing device 355 of the data service hub. In routine 1265, the reduced RF packets are converted to the original RF analog signals that were originally produced by the video service terminals 117. Further details of routine 1265 will be described below with respect to FIGS. 17 and 18. In step 1270, the RF analog signals are propagated to the RF receiver 309 that is coupled to the video services controller 115.

Figure 13:
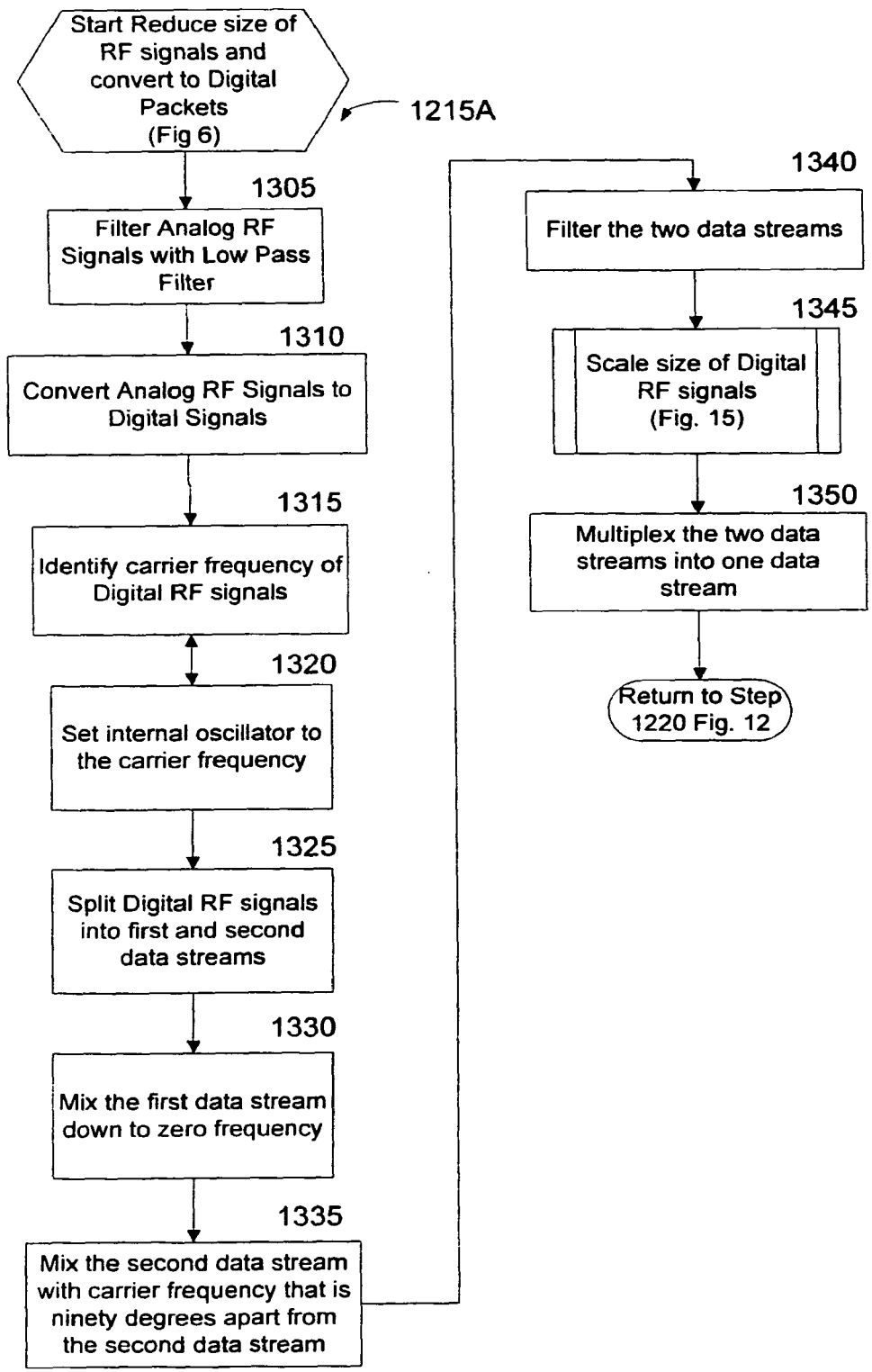
FIG. 13 is a logic flow diagram corresponding to the hardware of FIG. 6 and exemplary submethod of FIG. 12 for reducing the size of the upstream RF signals and converting the analog RF signals to digital data packets according to one exemplary embodiment of the present invention.

Referring now to FIG. 13, this Figure is a logic flow diagram corresponding to the hardware of FIG. 6 and exemplary submethod 1215A of FIG. 12 for reducing the size of the upstream RF signals and converting the analog RF signals to digital data packets according to one exemplary embodiment of the present invention. Step 1305 is the first step of the submethod 1215A in which analog RF signals are filtered with the low pass filter 519 of the diplexer 507 positioned in the subscriber optical interface 140A. In step 1310, the diplexer 507 passes the upstream analog RF signals to an analog-to-digital (A/D) converter 509. Meanwhile, in step 1315, the frequency of the phase locked loop 523 can be determined by a frequency detector 521 that measures the frequency of the RF signal at the A/D converter 509 passing out of the low pass filter 519. The measured frequency can be calculated by measuring the time between a plurality of zero crossings of the digitized RF signal.

In step 1320, the local oscillator 526 can be set to this measured frequency. Next, in step 1325, from the A/D converter 509, the digital RF signals can be split into two data streams. In step 1330, a first data stream can be mixed down to a zero frequency in a first mixer 528A by mixing the first data stream with a carrier frequency produced by a local oscillator 526. In other words, this mixing process can be driven by the local oscillator 526 which can be frequency controlled from a phase locked loop (PLL) 523.

In step 1335, a second data stream flowing out of the A/D converter 509 can be mixed in a second mixer 528B with a carrier signal that is at the same frequency as the first carrier or local oscillator signal, but phased ninety degrees apart from the first carrier signal. This phase shift of the first carrier signal can be made with a phase shifter 527.

In step 1340, the first and second data streams flowing through the first and second mixers 528A, 528B can be propagated through low pass filters 519A, 519B. Next, in routine 1345, the two data streams can then be scaled down with a data scaler 539 in order to reduce the amount of digitized RF data transmitted. While in the data reducer 539, certain algorithms are applied to reduce the amount of data transmitted. A number of algorithms related to subsampling and other techniques are known to those skilled in the art. Further details of the data scaler 539 and routine 1345 will be discussed below with respect to FIG. 15.

In step 1350, the two data streams are combined and muliplexed to a data conditioner 407. The process then returns to step 1220 of FIG. 12.

Figure 14:
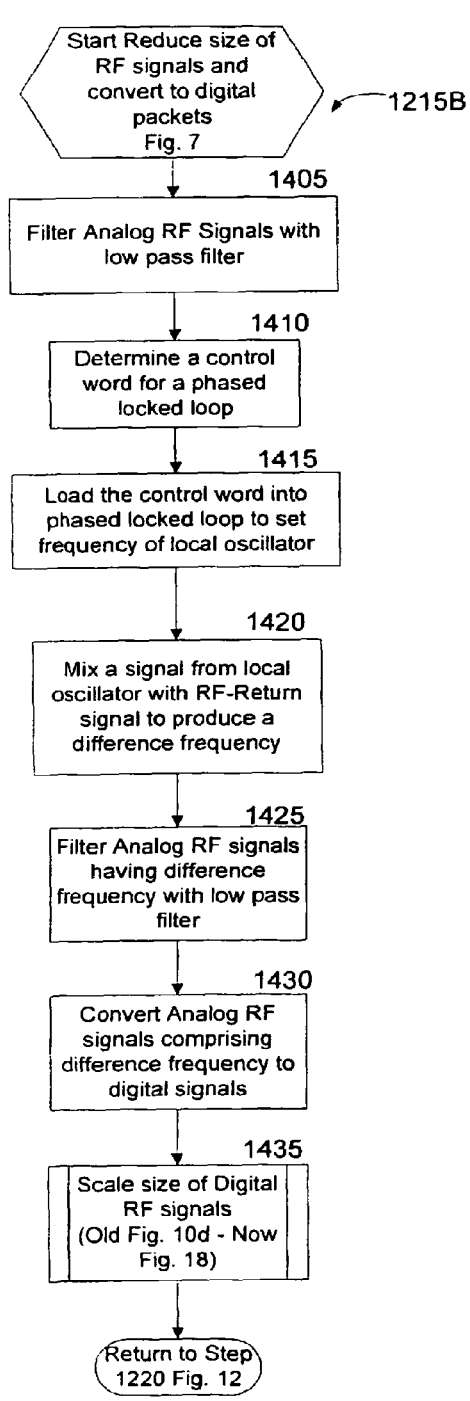
FIG. 14 is a logic flow diagram corresponding to the hardware of FIG. 7 and exemplary submethod of FIG. 12 for reducing the size of the upstream RF signals and converting the analog RF signals to digital data packets according to one exemplary embodiment of the present invention.

Referring now to FIG. 14, this Figure is a logic flow diagram corresponding to the hardware of FIG. 7 and exemplary submethod 1215B of FIG. 12 for reducing the size of the upstream RF signals and converting the analog RF signals to digital data packets according to one alternate and exemplary embodiment of the present invention. Step 1410 is the first step of the exemplary submethod 1215B in which in which analog RF signals from a video services terminal 117 are filtered with the low pass filter 519 of the diplexer 507 positioned in the subscriber optical interface 140A.

Next, in step 1410, a control word for a phase locked loop 523 is determined. In step 1415, the control word is loaded into the phase locked loop 523 to establish a frequency of the oscillator 526. In this embodiment, the local oscillator frequency can be determined by measuring the frequency of the incoming RF signal flowing out of a first low pass filter 519A. The measured frequency can be calculated by measuring the time between a plurality of zero crossings of the RF signal. Once the measured frequency is determined, then an offset frequency can be added to the measured frequency such that the RF signal has side bands that extend near, but do not cross, a zero frequency value.

In step 1420, the analog signal from the local oscillator 526 is mixed with the analog RF return signal generated by the video services terminal 117 in the mixer 528 to produce a difference frequency. In step 1425, the difference frequency is filtered with a second low pass filter 519B and is fed into an A/D converter 509. Next, in step 1430, the difference frequency is converted to the digital domain with the A/D converter 509. In routine 1435, the digital RF signals are then scaled down with the data scaler 539 to reduce the amount of RF data transmitted. Further details of the data scaler 539 and routine 1345 will be discussed below with respect to FIG. 15. The process then returns to step 1220 of FIG. 12.

Figure 15:
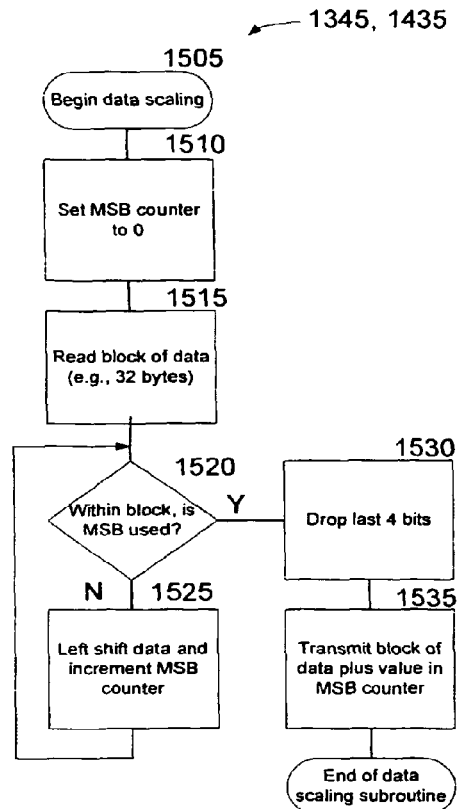
FIG. 15 is a logic flow diagram illustrating an exemplary submethod of FIGS. 13 and 14 for scaling data received from a video service terminal that can be performed by a data scaler as illustrated in FIGS. 8 and 9.

Referring now to FIG. 15, this Figure is a logic flow diagram illustrating an exemplary submethod 1345, 1435 of FIGS. 13 and 14 for scaling data received from a video service terminal 117 that can be performed by a data scaler 539 as illustrated in FIGS. 8 and 9. The data scaling unit 539 removes unnecessary numbers of bits from each sample, while maintaining the maximum scaling of the data. The technique is familiar to those skilled in the art, and for example has been used in the British NICAM (Near Instantaneous Compression and Modulation) method of transmitting digital audio information on an analog channel.

FIG. 15 illustrates one exemplary data scaling algorithm 1345, 1435 that can be performed by data scaling unit 539. The data scaling algorithm 1345, 1435 uses an example of reducing an 8 bit sample down to 4 bits, though other reductions can be used and are not beyond the scope of the present invention. The algorithm starts at step 1505. A counter, called an MSB (most significant bit) counter is used in the routine to keep track of the number of places on the left of a data word have been eliminated, as will be evident from the description below. The MSB counter is initially set to a count of 0 in step 1510.

In step 1515, a block of data, such as, but not limited to, thirty-two 8-bit bytes, are read and processed. Within that block of data, each sample is examined in step 1520 to determine if the MSB is a 1 or a 0. If all samples in the block have a 0 in the MSB position, then the inquiry to decision step 1520 is answered "No", meaning that the MSB is not used in any data in that set of bytes. If the inquiry to decision step 1520 is negative, then the "No" branch is followed to step 1525 in which the data may be shifted left.

At the same time, the MSB counter referred to above is incremented by 1, to keep track of how many times the block has been shifted. Operation then returns to decision step 1520, which again decides whether the MSB is used. If not, then the process repeats through step 1520, until the MSB is used. Note that this process applies to all the data words in the block of data being processed.

When the MSB is used, then the inquiry to decision step 1520 is positive and the "Yes" branch is followed to step 1530 in which the least significant four bits of the word are dropped. Thus, the routine 1345, 1435 has caused the retention of the four most significant bits that have data, in the block of data. These bits are transmitted in step 1535 along with the state of the MSB counter, which is used to reconstruct the waveform at the data service hub 110. The process then returns to either to step 1350 of FIG. 13 or step 1220 of FIG. 12.

Figure 16:
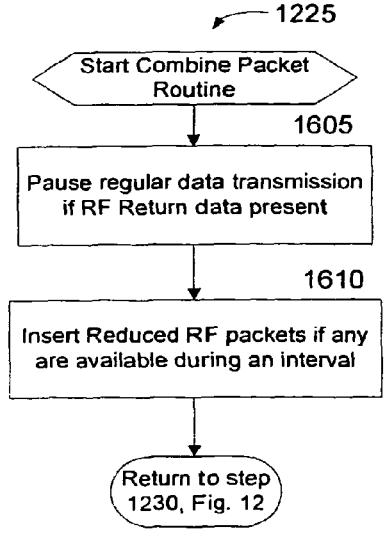
FIG. 16 is a logic flow diagram illustrating an exemplary subprocess of FIG. 12 for combining reduced RF packets with regular data packets.

Referring now to FIG. 16, this Figure is a logic flow diagram illustrating an exemplary subprocess 1225 of FIG. 12 for combining reduced RF packets with regular data packets. The combining reduced RF packets with regular data packets routine 1225, starts with step 1605. In step 1605, the regular data transmission of ordinary data packets produced by the processor 550 in FIG. 8 is interrupted during predetermined intervals. As noted above, while the upstream transmission of data packets can be interrupted at intervals with upstream RF packet transmission, it is noted that the intervals of interruption do not need to be regularly spaced from one another in time. However, in one exemplary embodiment, the interruptions can be designed to be spaced at regular, uniform intervals from one another. In another exemplary embodiment (not shown), the interruptions could be spaced at irregular, non-uniform intervals from one another.

In step 1610, reduced RF packets are inserted between irregular data packets if the RF packets are available during an interval. Step 1610 corresponds to the simultaneous activation of switches 513 in each subscriber optical interface 140 that is part of a subscriber grouping. The subscriber groupings are usually determined by the number of subscribers that will be serviced by a particular video service receiver 309 that is typically located in the data service hub 110. After step 1610, the subprocess ends and the process returns to step 1230 of FIG. 12.

Figure 17:
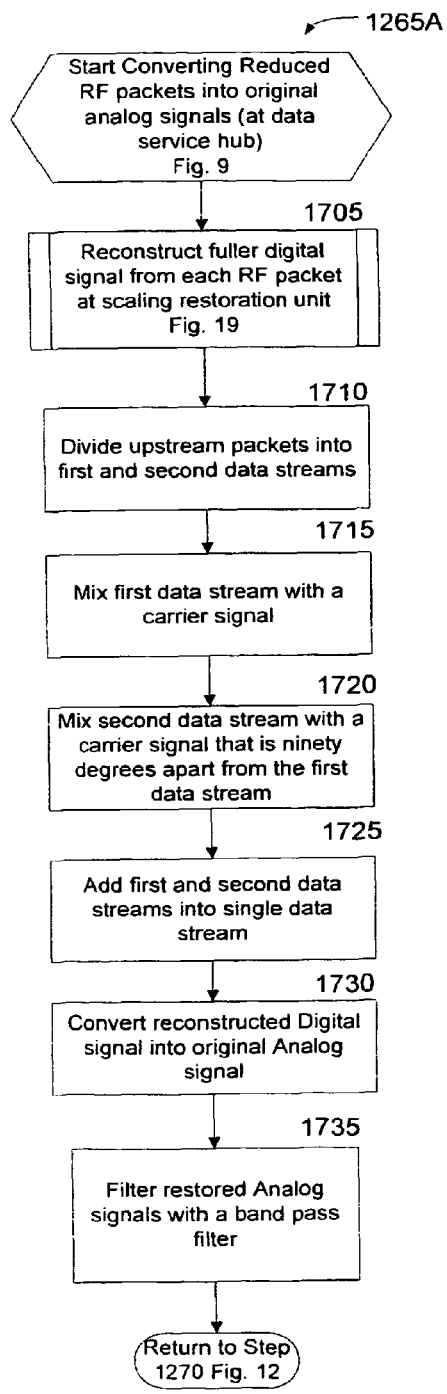
FIG. 17 is a logic flow diagram illustrating a preferred exemplary subprocess of FIG. 12 for converting reduced RF data packets into original analog signals according to one exemplary embodiment of the present invention.

Referring now to FIG. 17, this Figure is a logic flow diagram that corresponds to the hardware of FIG. 9 and illustrates a preferred exemplary subprocess 1265A of FIG. 12 for converting reduced RF data packets into original analog signals according to one exemplary embodiment of the present invention. Routine 1705 is the first step of the subprocess 1265A in which the RF data packets received from either the Internet router 340 or laser transceiver node routing device 355 are restored with the scaling restoration unit 317. Further details for the scaling restoration unit 317 and the scaling restoration routine 1705 will be discussed below with respect to FIG. 19.

Next in step 1710, the upstream restored RF packets are divided into first and second data streams. Next, in step 1715, the first data stream is mixed with the carrier frequency produced by the local oscillator 526 at the first mixer 528A. In step 1720, the second data stream is mixed with a carrier signal produced by a phase shifter 527 that is ninety degrees apart from a carrier frequency produced by a local oscillator 526 at a second mixer 528B.

In step 1725, the first data stream and second data stream are then added together at an adder 905. In step 1730, the restored digital RF data packets are then converted back to the original RF analog signal with a digital-to-analog (D/A) converter 910. And in step 1735, the restored analog RF signal is then filtered with a bandpass filter 915.

Figure 18:
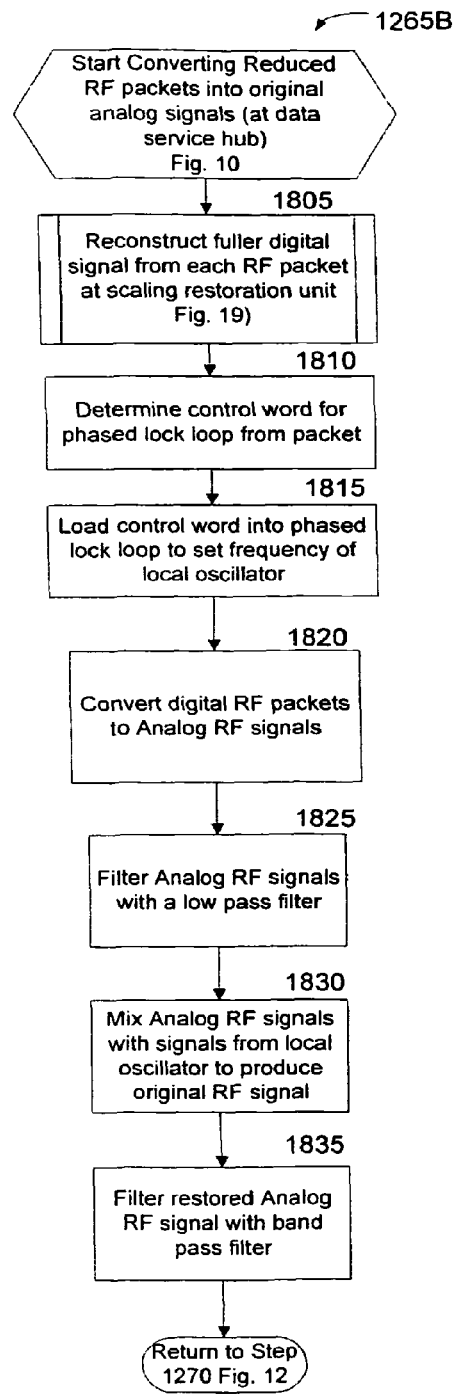
FIG. 18 is a logic flow diagram illustrating an alternate exemplary subprocess of FIG. 12 for converting reduced RF data packets into original analog signals according to one exemplary embodiment of the present invention.

Referring now to FIG. 18, this Figure is a logic flow diagram that corresponds to the hardware of FIG. 10A and that illustrates an alternate exemplary subprocess 1265B of FIG. 12 for converting reduced RF data packets into original analog signals according to one exemplary embodiment of the present invention. Routine 1805 is the first step of the exemplary conversion subprocess 1265B in which the original and fuller digital RF signal is reconstructed with the scaling restoration unit 317. Further details of the scaling restoration unit 317 and scaling restoration routine 1805 will be discussed below with respect to FIG. 19.

During the restoration routine 1805, in step 1810, a control word for a phase locked loop 523 is determined. In other words, the control word can be read from the identification information of an upstream RF packet that was produced by a data conditioner 407 in the subscriber optical interface 140, discussed above. Next, in step 1810, the control word is then loaded into the phase locked loop 523 to set the frequency of a local oscillator 528. Meanwhile, in step 1820, the restored digital RF signal is fed to a digital-to-analog converter 910 where it is converted back into an analog RF signals.

In step 1825, the analog RF signal is filtered with a low pass filter 519. In step 1830, the filtered analog RF signal is then mixed with the carrier frequency produced by the local oscillator 526 at a mixer 528. And in step 1835, the combined signal is then filtered by a bandpass filter 915. The process then returns to step 1270 of FIG. 12.

Figure 19:
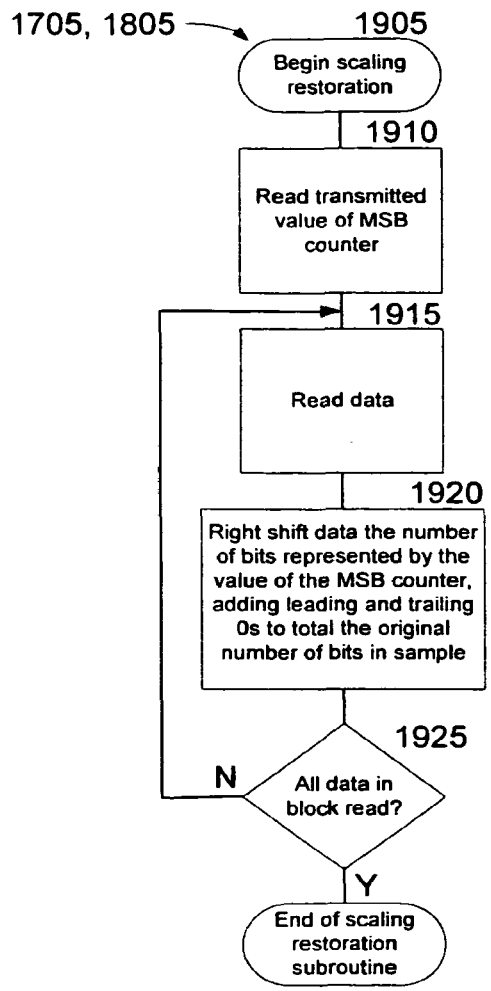
FIG. 19 illustrates an exemplary scaling restoration process according to one exemplary embodiment of the present invention.

Referring now to FIG. 19, this Figure illustrates an exemplary scaling restoration process 1705, 1805 according to one exemplary embodiment of the present invention. The restoration process starts at step 1905. The value of the MSB counter is read in step 1910, then data is read in 1115. For each data word, the data is shifted right by the MSB counter value in step 1920, with leading zeros being added to the left of the transmitted bits. Of course, if fewer than the four most significant bits in the original word have been dropped, then some least significant bits are converted to zero by the process, but they represent only small errors in the recovered signal, and are tolerable.

In decision step 1925, it is determined whether all of the data the current transmission or block has been read. If the inquiry to decision step 1925 is negative, then the "No" branch is followed back to step 1915. If the inquiry to decision step 1925 is positive, then the "Yes" branch is followed to step 1930 where the data scaling restoration process ends and then returns to either step 1230 of FIG. 17 or step 1810 of FIG. 18.

Figure 20:
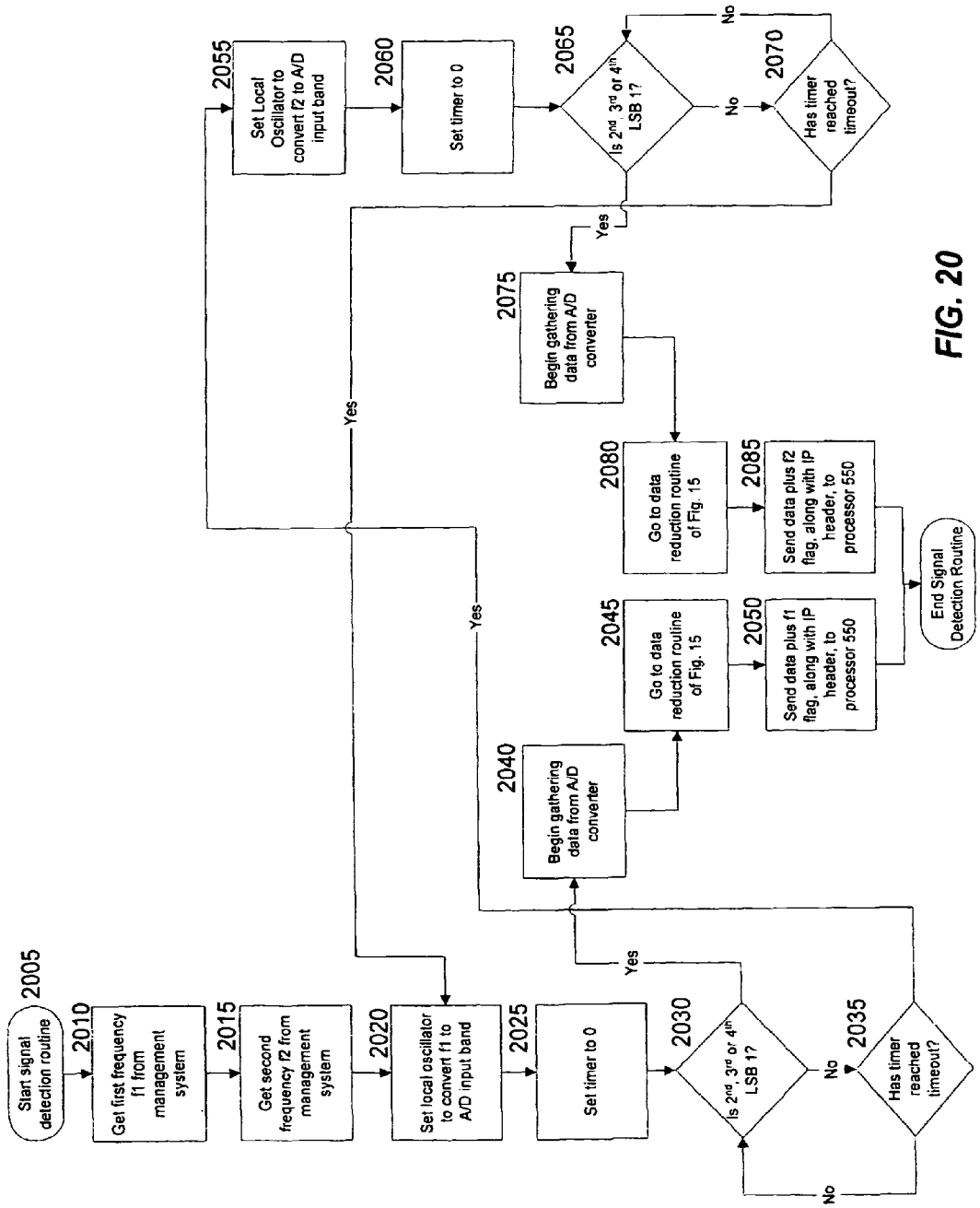
FIG. 20 is a logic flow diagram illustrating multiplexing to accommodate multiple RF return frequencies according to one alternate exemplary embodiment of the present invention.

Referring now to FIG. 20, this Figure is a logic flow diagram that corresponds with the hardware of FIG. 11 and that illustrates multiplexing to accommodate multiple RF return frequencies according to one alternate exemplary embodiment of the present invention. FIG. 20 describes some actions taken by the data scaler 539 of FIG. 11 where it controls the phase locked loop 523 to "tune" either frequency/channel to a low frequency to be digitized by the A/D converter 509. The data scaler 539 tunes to one frequency then to the other, pausing long enough to determine if a signal is present at the A/D converter 509. If a signal is not present at the A/D converter 509, then the data scaler tunes the phase locked loop 523 to the opposite frequency. The exemplary multiplexing process 2000 begins with step 2005. This process 2000 runs continually.

In step 2010, the data scaler 539 receives the first frequency, f1, from an element management system. An element management system (EMS) is a control system that interfaces with equipment to set up and change operating parameters and to receive, process, and display alarms generated in the equipment. EMS's are generally well known to those skilled in the art. In step 2015, the data scaler 539 receives the second frequency, f2. These frequencies f1 and f2 can be supplied manually to the element management system. In Step 2020, the oscillator 526 is set or tuned to frequency "f1." The A/D converter 509 converts any signal found into a digital signal. In Step 2025, a timer is set to zero.

In decision step 2030, the output of the A/D converter 509 is examined to determine if a signal is present. In this step 2030, a signal is present if any of the second, third, or fourth bits from the least significant bit (LSB) of the A/D converter 509 is one. If the second, third, or fourth LSB is one, then it is concluded that a signal is present, and the operation continues to step 2040 where data is gathered from the A/D converter 509. After a block of data is gathered, in step 2045, the data block is processed by the data reduction routine 1725, 1805 of FIG. 19. After step 2045, in step 2050, the RF return data is transmitted to the data-to-RF converter 307 via processor 550 along with an indicator created by data conditioner 407 that frequency f1 was converted.

In decision step 2030, if the second, third, or fourth bit is not 1, then decision step 2030 yields a negative inquiry and the process proceeds to decision step 2035 in which it is determined whether the timer has reached a time out. The timer is set to a time such that if a signal is present at the time that step 2025 is entered, then before the timer times out, it will happen that the second, third, or fourth LSB will have a non-zero value. This time may be computed from knowledge of the carrier frequency involved in the signal to be digitized and the amplitude that the set top communications system will drive the signal to. If the timer has not reached a time out (meaning that enough time has not transpired for the second, third, or fourth bit to become one), then the process proceeds back to step 2030 and another sample is taken.

If in decision step 2035, the timer has timed out, and it is concluded that frequency f1 is not present and the other frequency f2 should be tested. The process proceeds to step 2055 in which the frequency f2 is examined in a manner similar to f1 discussed above. In other words, steps 2060, 2065, 2070, 2075, 2080, and 2085 correspond with steps 2025, 2030, 2035, 2040, 2045, and 2050.

Figure 21:
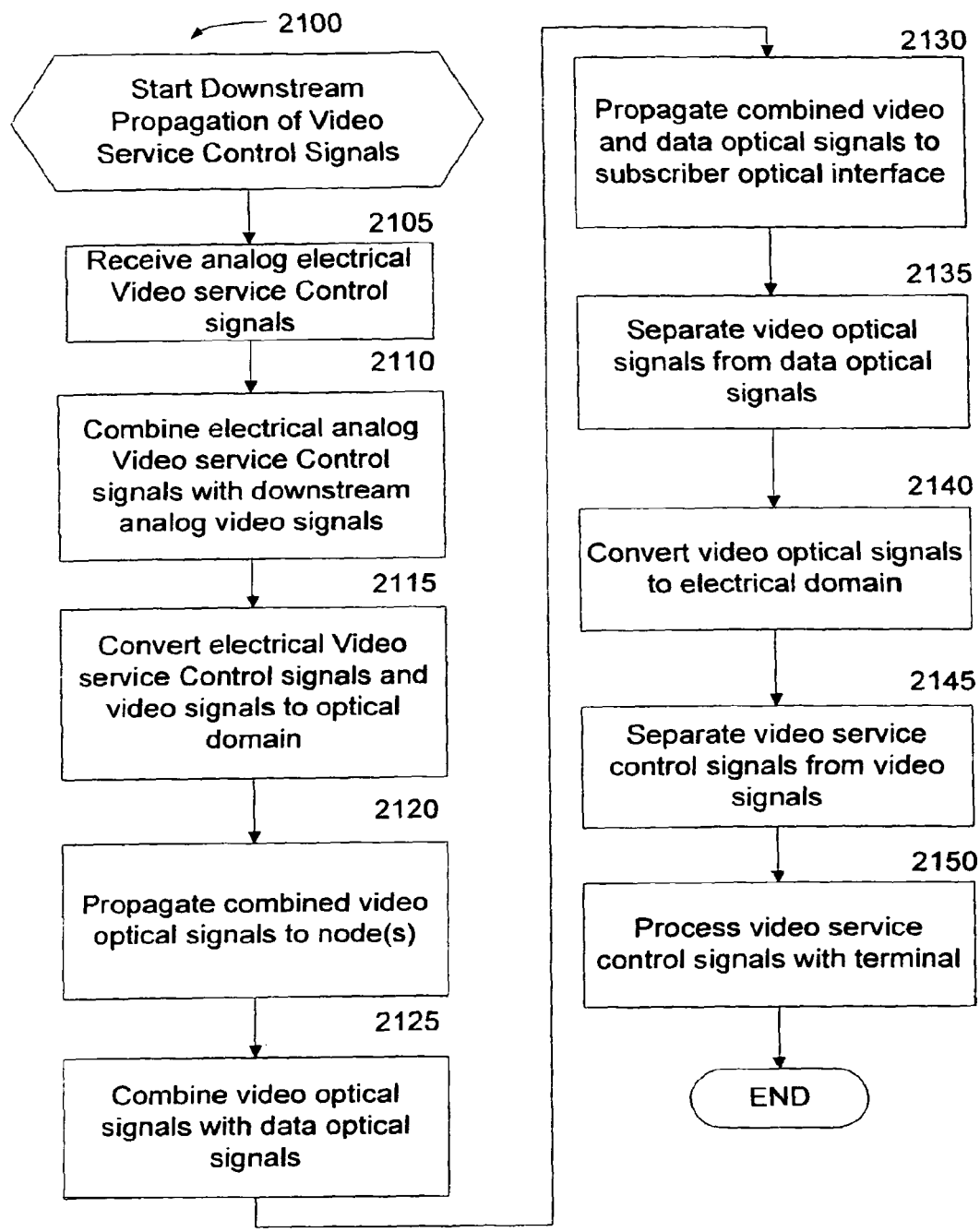
FIG. 21 is a logic flow diagram illustrating the exemplary processing of downstream video service control signals according to an exemplary embodiment of the present invention.

Referring now to FIG. 21, this Figure is a logic flow diagram illustrating the exemplary processing 2100 of downstream video service control signals according to an exemplary embodiment of the present invention. The downstream process 2100 starts in first step 2105. In step 2105, analog electrical video service control signals are received from a video service controller 115. Next, in step 2110, the analog electrical video service control signals are combined with analog downstream video signals.

In step 2115, the analog electrical video service control signals and video signals are converted to the optical domain with an optical transmitter 325. The combined video optical signals are propagated towards laser transceiver nodes 120 via optical wave guides 160. In step 2125, the combined video optical signals are also combined with data optical signals in the laser transceiver node 120. Specifically, in an exemplary embodiment of the present invention, the video optical signals can be combined with the data optical signals in a diplexer 420.

The combined video and data optical signals are propagated along an optical wave guide 150 to a subscriber optical interface 120. In step 2135, the video optical signals are separated from the data optical signals with an optical diplexer 515. The video optical signals are then converted to the electrical domain with an analog optical receiver 525.

In step 2145, the video service control signals are separated from the regular video signals in the video services terminal 117. Next, in step 2150, the video service control signals are processed by the video service terminal 117.

Alternate Embodiments

The present invention is not limited to the aforementioned laser transceiver nodes 120. The present invention may employ nodes 120 that operate with LEDs that produce wavelengths that may be unique to subscribers or groups of subscribers. In other words, each node 120 can further comprise one or more wavelength division multiplexers and demultiplexers. Each wavelength division multiplexer (WDM) can select one or more wavelengths of optical bandwidth originating from a respective optical tap multiplexer. Each WDM can then combine the one or more wavelengths of optical bandwidth together and feed them into a single optical waveguide 150. In this way, one optical waveguide 150 can service a number of individual optical taps 130 that can correspond to the number of optical tap multiplexers 440 present in the bandwidth transforming node 120. In such an exemplary embodiment, each optical tap 130 can divide data signals between a plurality of subscribers and can be capable of managing optical signals of multiple wavelengths.

The present invention is not limited to providing a return path for just legacy video service terminals 117. The return path of the present invention can be carry signals of other hardware devices that may not characterized as "legacy" hardware. The present invention may simply be used to provide increased bandwidth for additional conventional electronic communication devices that are supported by the optical network.

Conclusion

Thus, the present invention provides a unique method for inserting RF packets (derived from RF signals produced by a video service terminal) between upstream packets comprising data generated by a subscriber with a digital communication device such as a computer or Internet telephone. Thus, the present invention provides an RF return path for legacy terminals that shares a return path for regular data packets in an optical network architecture.

It should be understood that the foregoing relates only to illustrate the embodiments of the present invention, and that numerous changes may be made therein without departing from the scope and spirit of the invention as defined by the following claims.

What is claimed is:

1. A return path for RF-modulated video service control signals comprising:
a subscriber optical interface for receiving upstream RF-modulated video service control signals in the electrical domain, the subscriber optical interface comprising an RF diplexer, the RF diplexer comprising a first RF filter for passing the upstream RF-modulated video service control signals in the electrical RF domain and blocking any extraneous RF-modulated signals, the RF diplexer comprising a second filter for passing downstream RF-modulated video signals in the electrical RF domain and blocking any extraneous RF-modulated signals, the first RF filter having an output port coupled to an input port of an A/D converter, the A/D converter for converting the upstream RF-modulated video service control signals to digital signals, the subscriber optical interface modulating an optical carrier with the digital signals for generating optical signals according to a timing dependent protocol and which are sent upstream relative to the subscriber optical interface.

2. The return path of claim 1, wherein subscriber optical interface receives downstream optical signals and transmits the downstream RF-modulated video service control signals in the electrical domain.

3. The return path of claim 1, wherein the RF-modulated video service control signals in the electrical domain are propagated according to one of a contention network protocol and a query-response protocol, the contention network protocol and query-response protocol supporting the control signals independently of time.

4. The return path of claim 1, wherein the video service control signals comprise one or more commands for managing video programming that is displayable on a display device.

5. The return path of claim 2, further comprising a data service hub for generating the downstream optical signals received by the subscriber optical interface and for transmitting downstream RF-modulated video service control signals modulated in the downstream optical signals.

6. The return path of claim 5, wherein the data service hub comprises a video service control terminal for generating the downstream RF-modulated video service control signals.

7. The return path of claim 1, wherein the subscriber optical interface comprises a data scaling unit for reducing data contained within the digital signals.

8. The return path of claim 1, wherein the digital signals comprise first digital packets, the subscriber optical interface combining the first digital packets with second digital packets in the time domain and according to the timing dependent protocol for upstream transmission of the combined first and second packets.

9. The return path of claim 1, further comprising one or more optical waveguides connected to the subscriber optical interface, for carrying the upstream optical signals and downstream optical signals.

10. The return path of claim 8, wherein the second packets comprise data other than the RF-modulated video service control signals.

11. A method for providing a return path for RF-modulated video service signals in an optical network system comprising:
  receiving one or more upstream RF-modulated video service control signals with a subscriber optical interface;
  receiving one or more downstream RF-modulated video signals with the subscriber optical interface;
  filtering the upstream RF-modulated video service control signals in the electrical RF domain with a first analog RF filter;
  blocking any extraneous upstream RF-modulated signals with the first analog RF filter;
  feeding an output of the RF filter into an input of an A/D converter;
  filtering the downstream RF-modulated video signals in the electrical domain with a second analog RF filter;
  blocking any extraneous downstream RF-modulated signals with the second analog RF filter;
  converting the one or more upstream RF-modulated video service control signals to digital signals with the A/D converter; and
  propagating the digital signals upstream with an optical carrier according to a timing dependent protocol.

12. The method of claim 11, wherein the video service control signals comprise upstream control information that are propagated according to one of a contention network protocol and a query-response protocol, the contention network protocol and query-response protocol supporting the control information independently of time.

13. The method of claim 12, wherein the video service control signals comprise one or more commands for managing video programming that is displayable on a display device.

14. The method of claim 11, further comprising converting digital signals to first digital information packets, and receiving a plurality of second digital information packets.

15. The method of claim 14, further comprising transmitting the first and second digital information packets by inserting the first digital information packet between the second digital information packets during a time interval.

16. The method of claim 11, further comprising generating downstream optical signals and transmitting the downstream RF-modulated video service control signals to the subscriber optical interface with a data service hub.

17. A method for returning RF signals from a subscriber in an optical network comprising:
  receiving modulated upstream RF video service control signals in the electrical domain with a subscriber optical interface;
  receiving one or more downstream RF-modulated video signals with the subscriber optical interface;
  filtering the modulated upstream RF video service control signals in the electrical RF domain with a first analog RF filter;
  blocking any extraneous upstream RF-modulated signals with the first analog RF filter;
  filtering the downstream RF-modulated video signals in the electrical domain with a second analog RF filter;
  blocking any extraneous downstream RF-modulated signals with the second analog RF filter;
  feeding an output of the first analog RF filter into an input of an A/D converter;
  converting the upstream RF video service control signals into digitized RF signals with the A/D converter of the subscriber optical interface;
  processing the digitized RF signals with the subscriber optical interface;
  converting the processed digitized RF signals into one or more packets with the subscriber optical interface; and
  propagating the packets towards a data service hub with an optical carrier according to a timing dependent protocol.

18. The method of claim 17, wherein the upstream RF video service control signals are propagated according to one of a contention network protocol and a query-response protocol, the contention network protocol and query-response protocol supporting the RF video service control signals independently of time.

19. The method of claim 17, wherein the video service control signals comprise one or more commands for managing video programming that is displayable on a display device.

20. The method of claim 17, further comprising reducing the amount of data contained in the digitized RF signals with a data scaling unit.

* * * * *